May 9, 1950
R. W. DART
2,506,632
AUTOMATIC PHOTOGRAPHIC PLATE EXPOSING
AND DEVELOPING APPARATUS
Filed Nov. 7, 1946
11 Sheets-Sheet 1
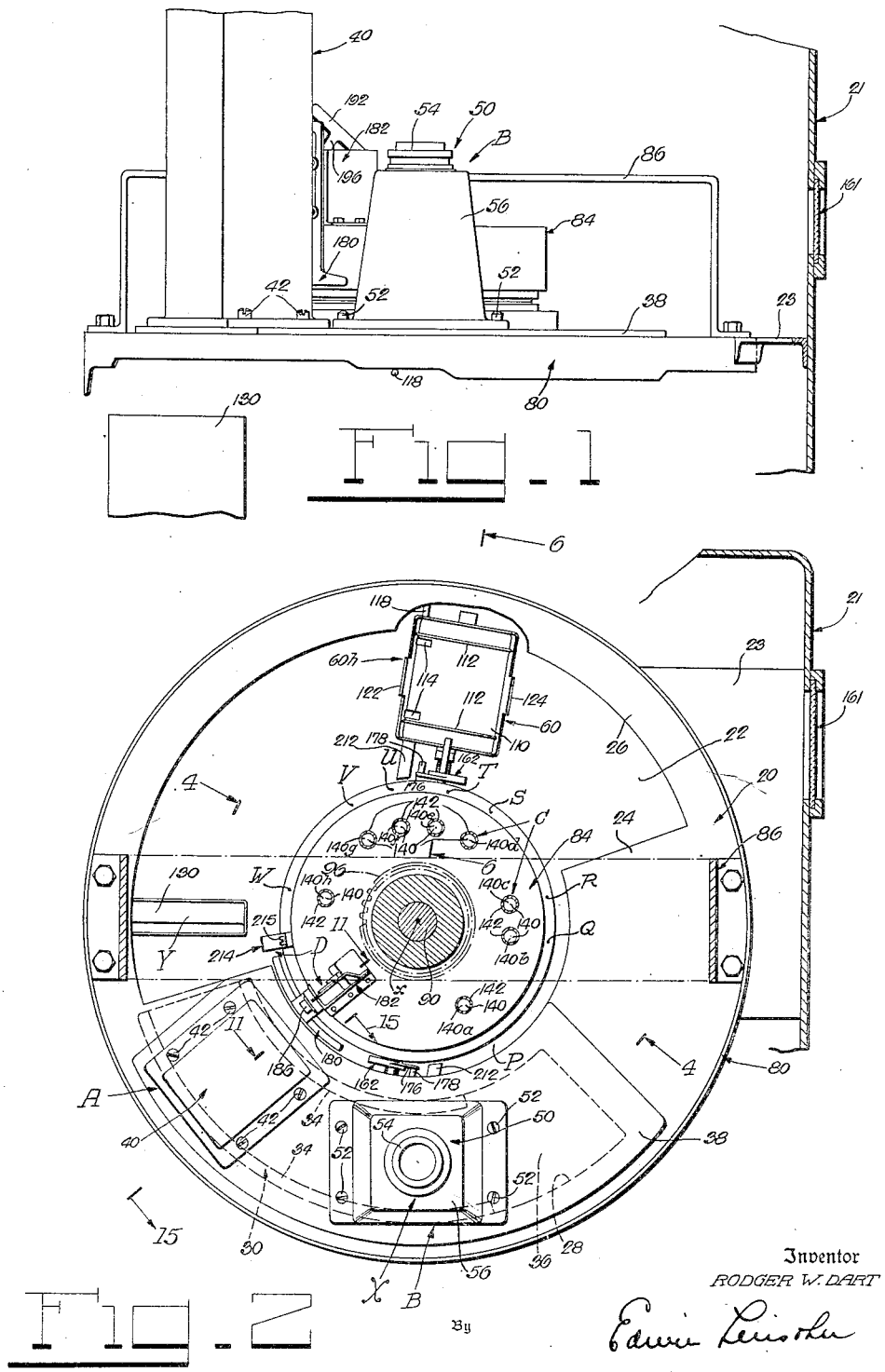
Inventor
RODGER W. DART
By
Edwin Leinster
Attorney

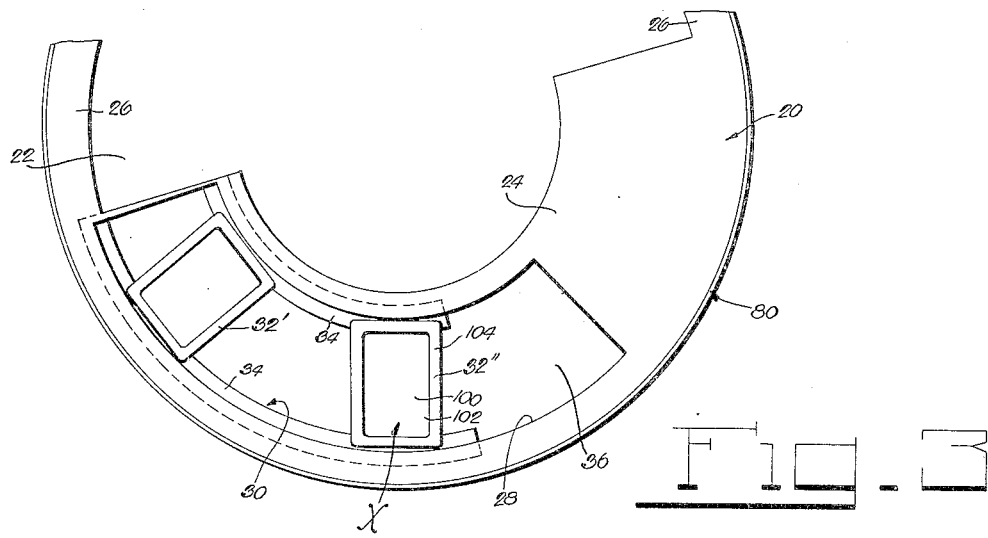
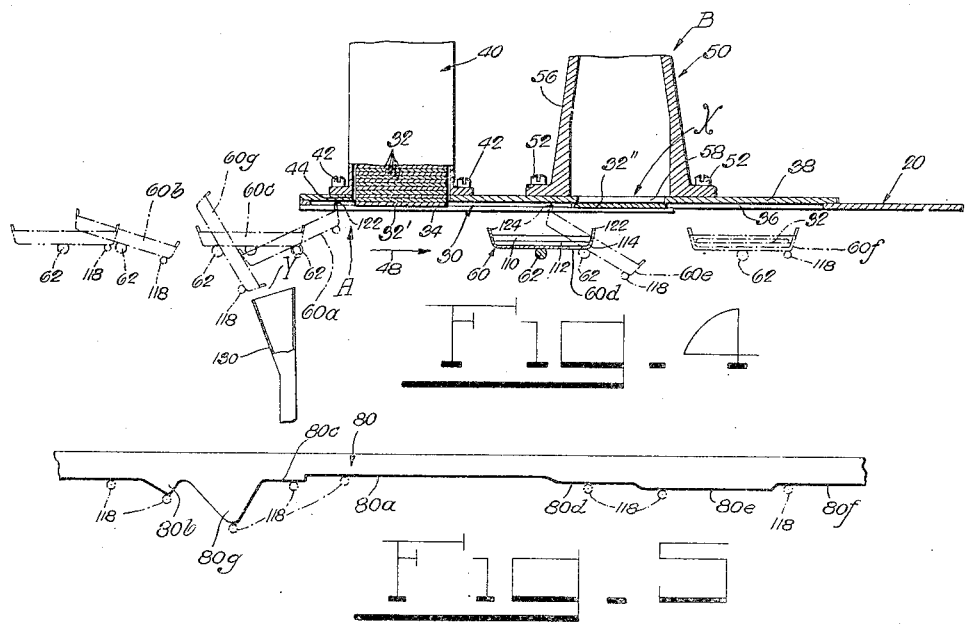

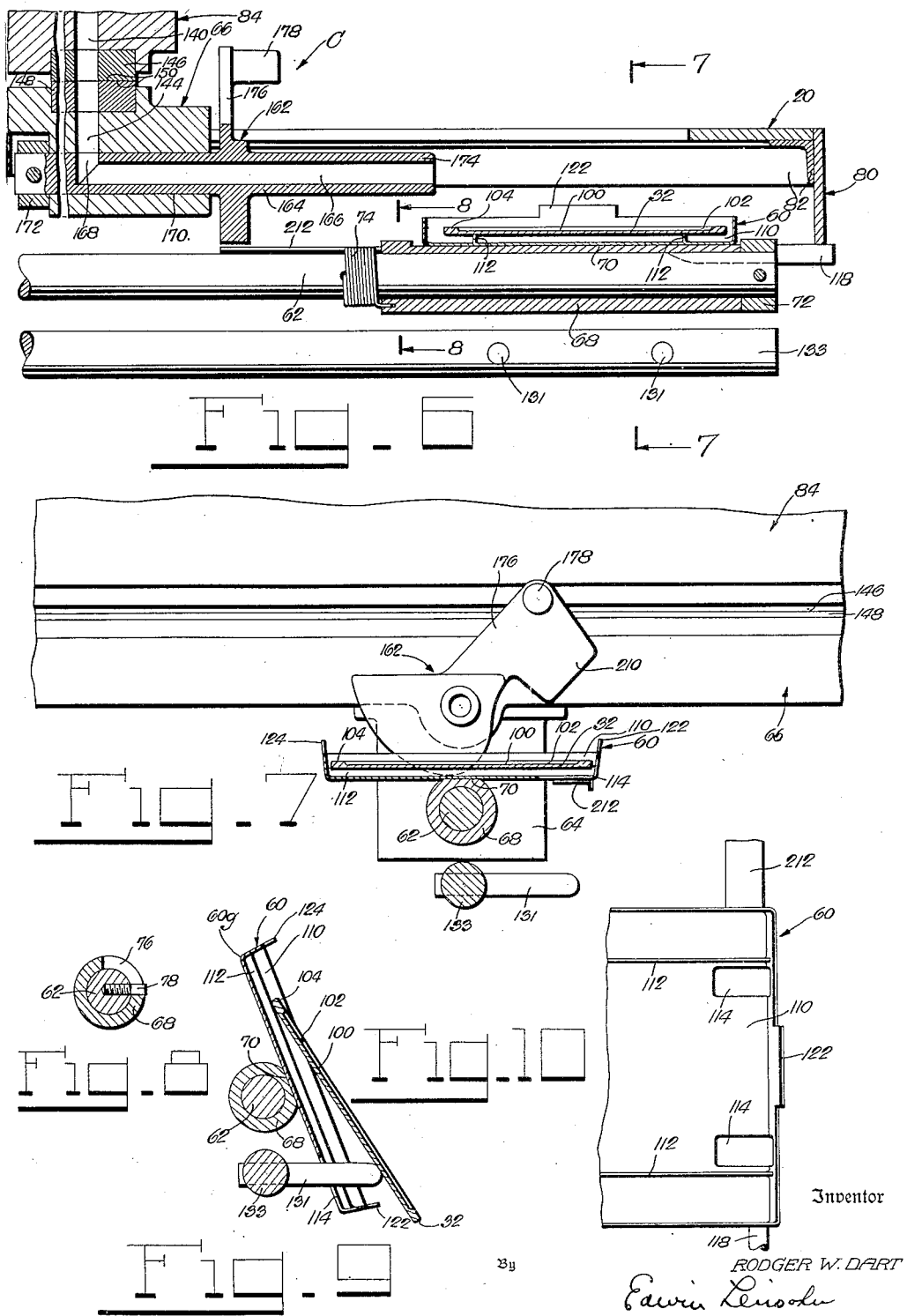

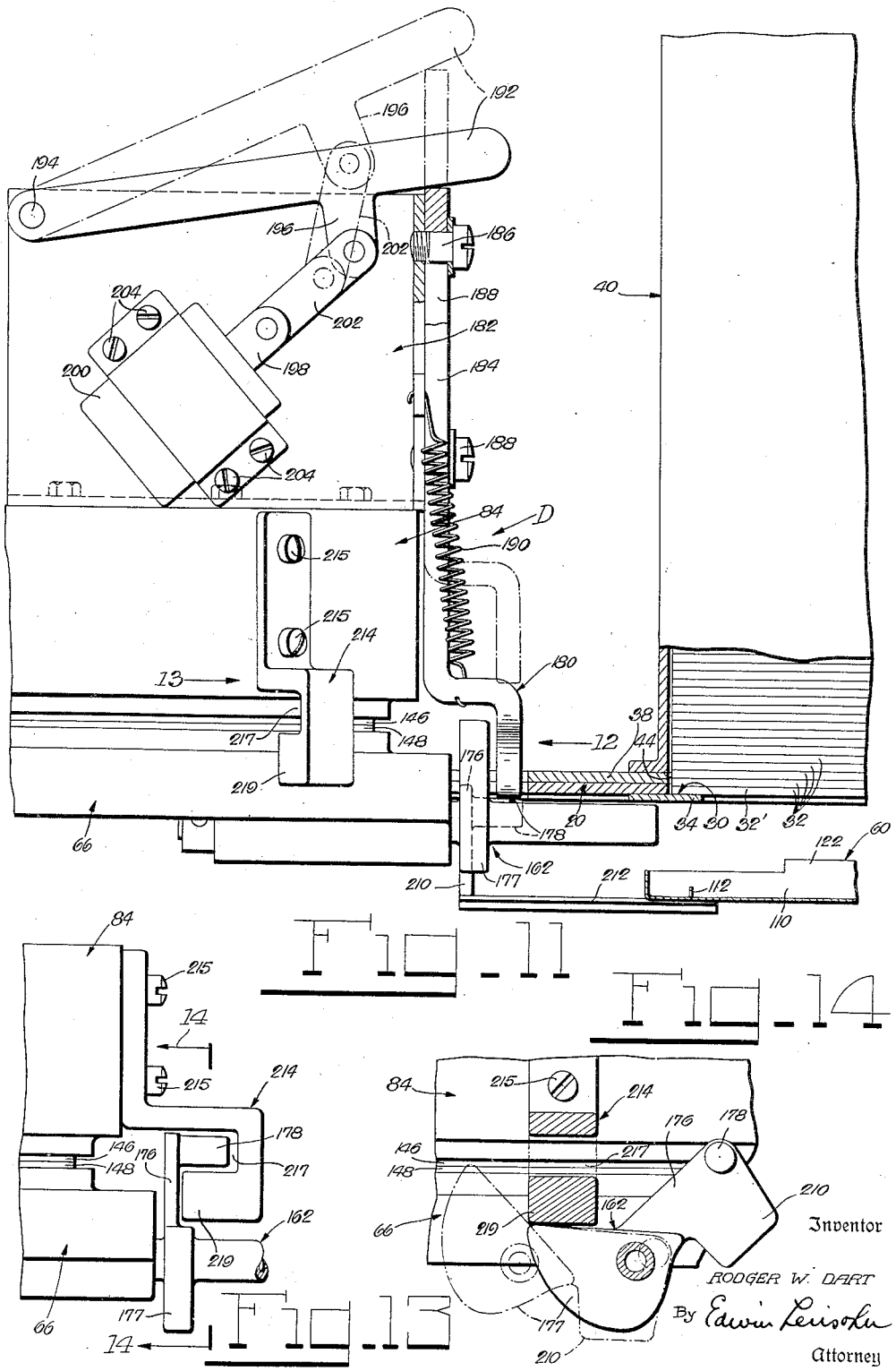

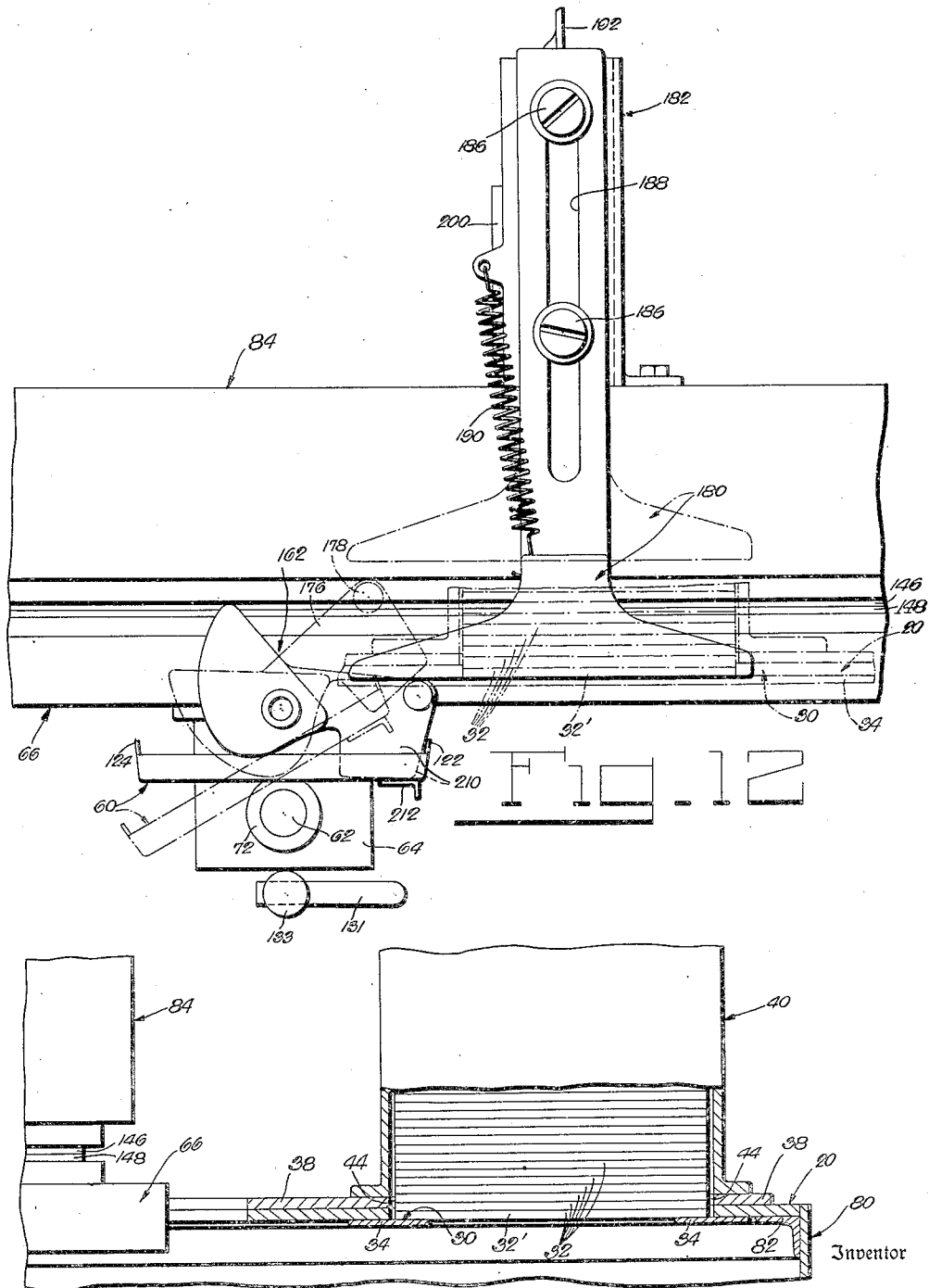

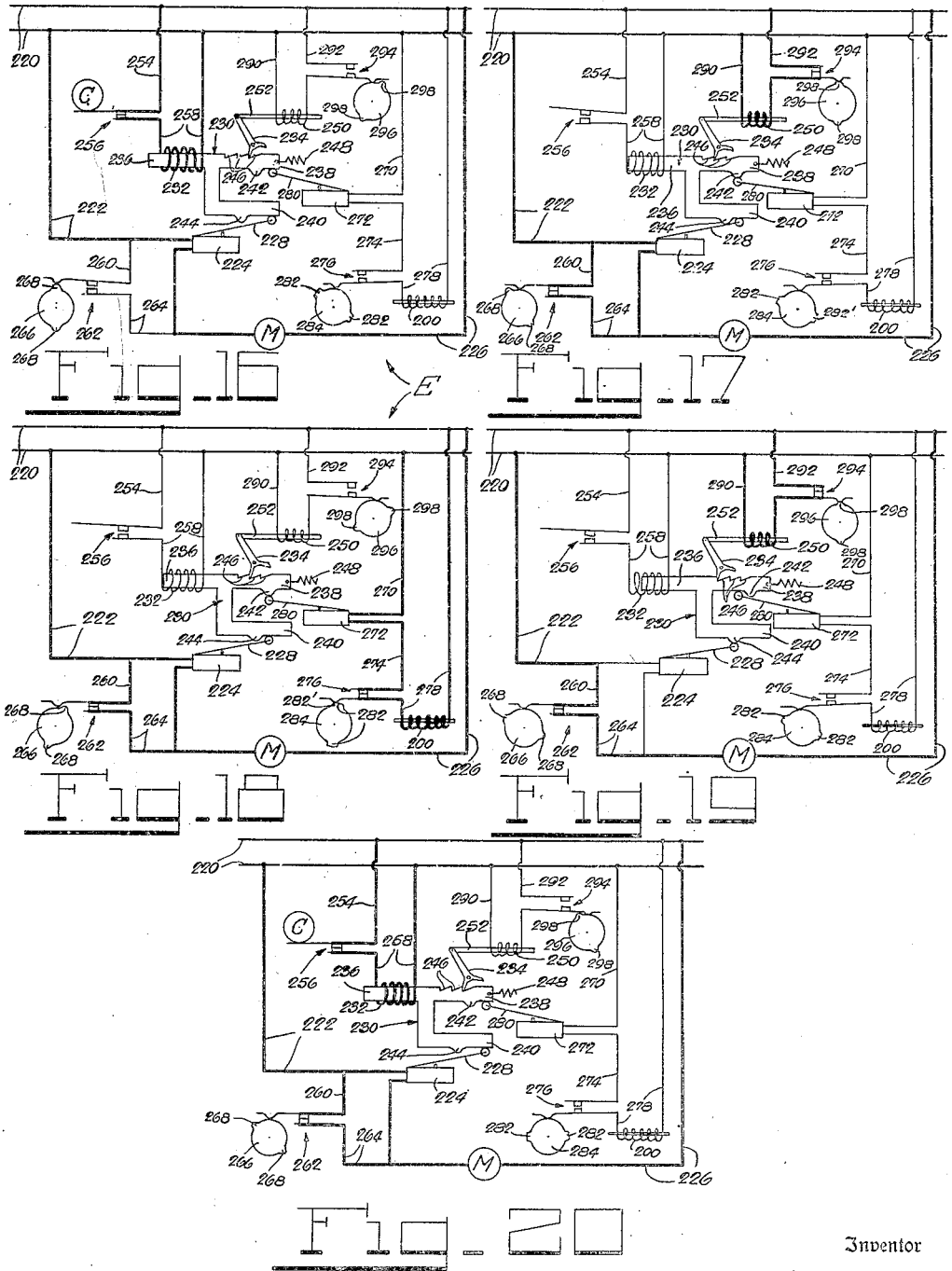

Inventor
RODGER W. DART
By Edwin Levisohn
Attorney

May 9, 1950 R. W. DART 2,506,632
AUTOMATIC PHOTOGRAPHIC PLATE EXPOSING
AND DEVELOPING APPARATUS
Filed Nov. 7, 1946 11 Sheets-Sheet 8
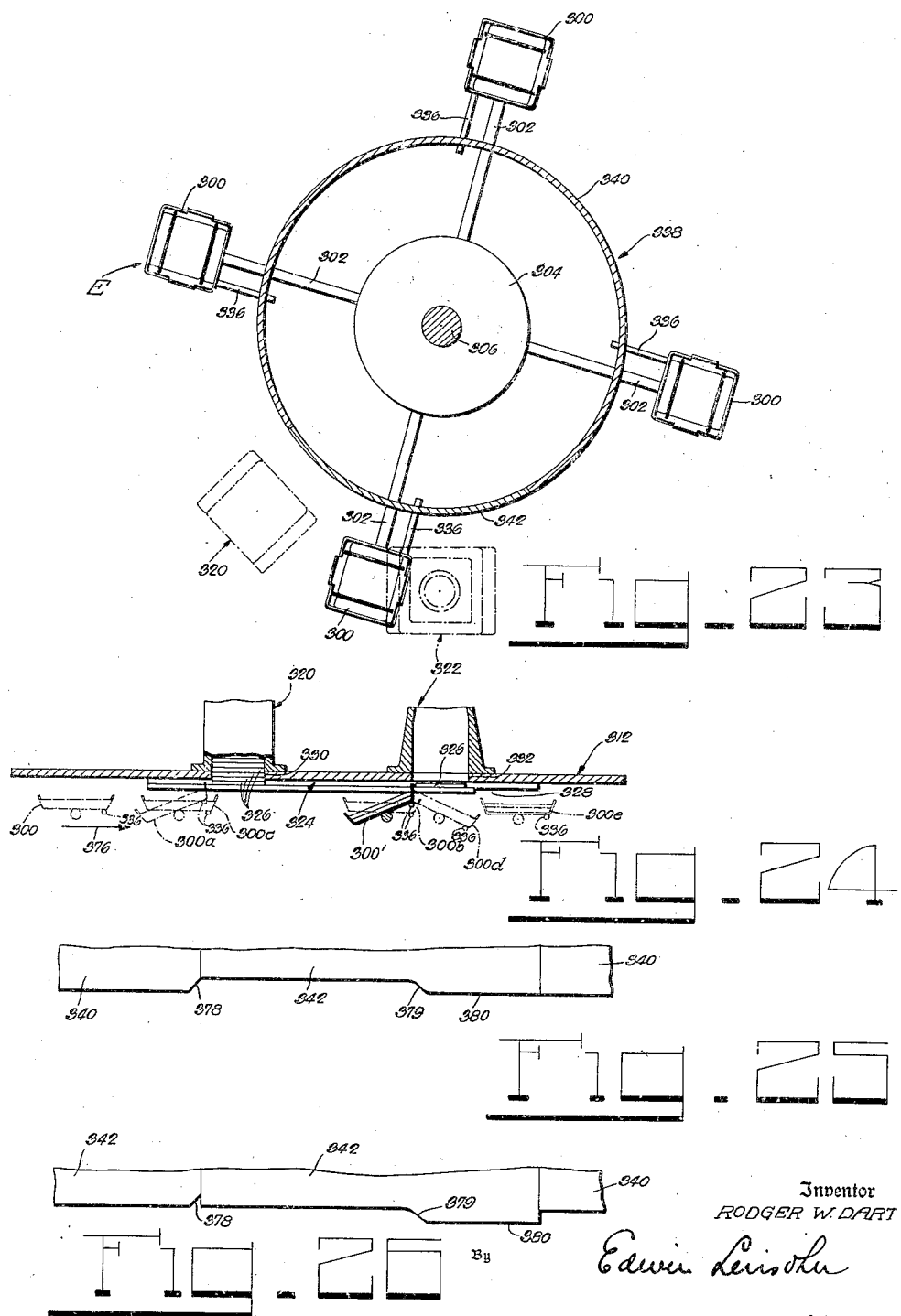
Inventor
RODGER W. DART
By Edwin Leinohn
Attorney

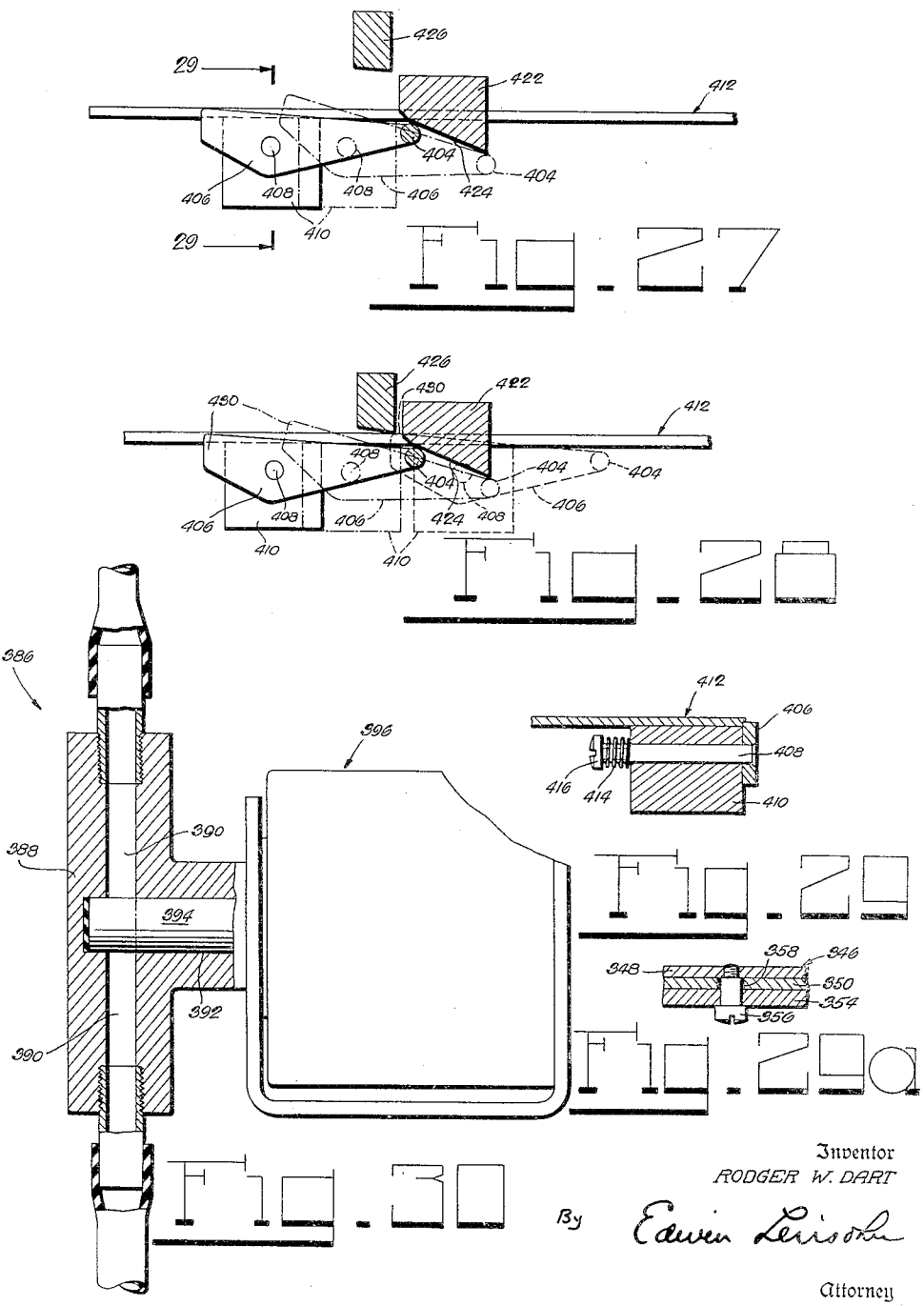

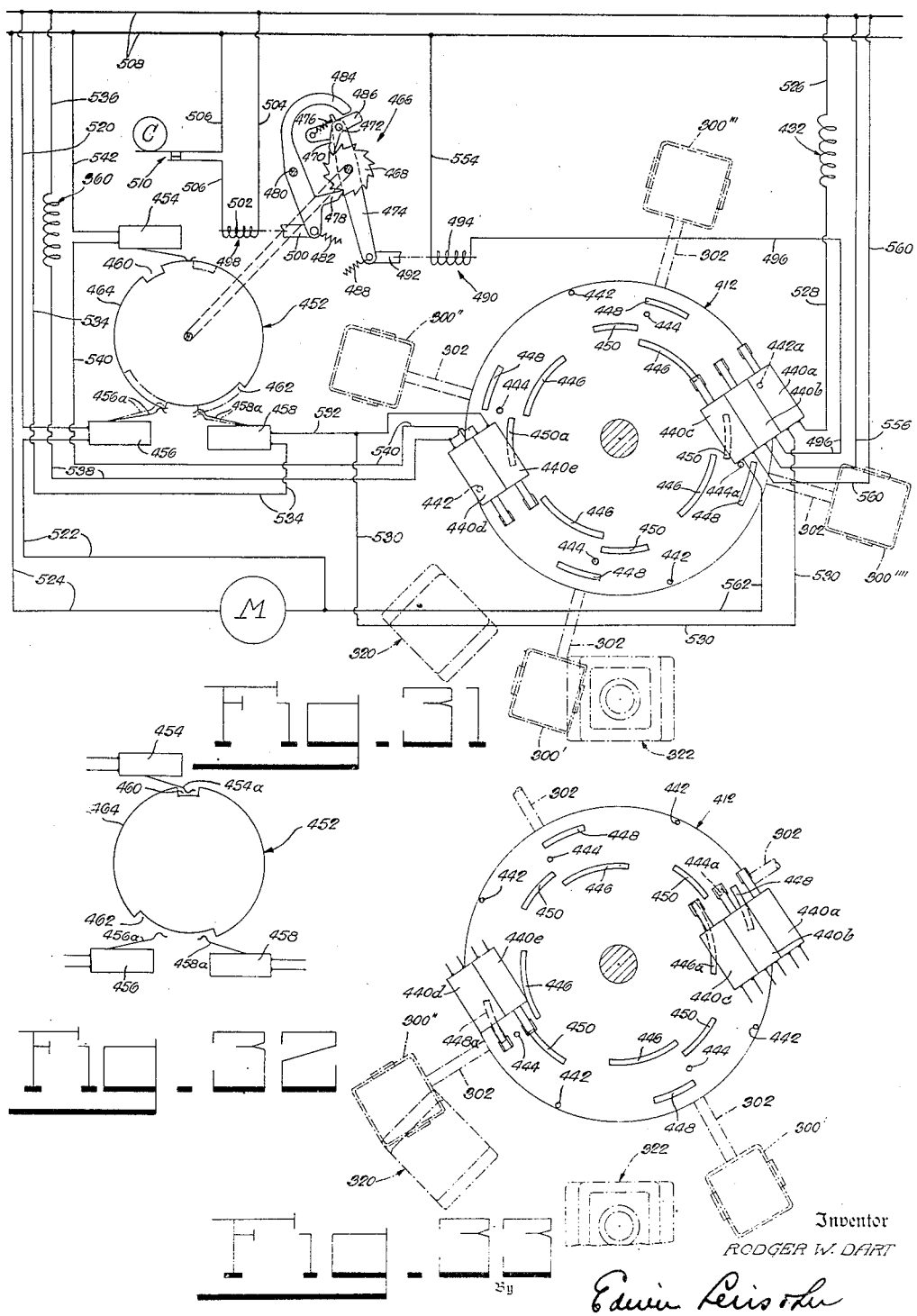

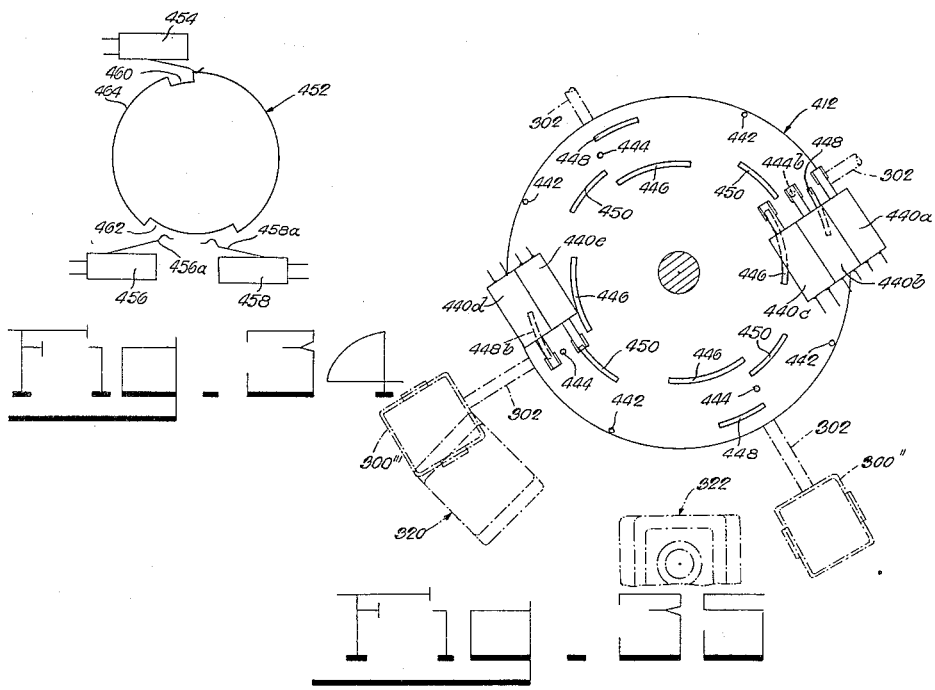
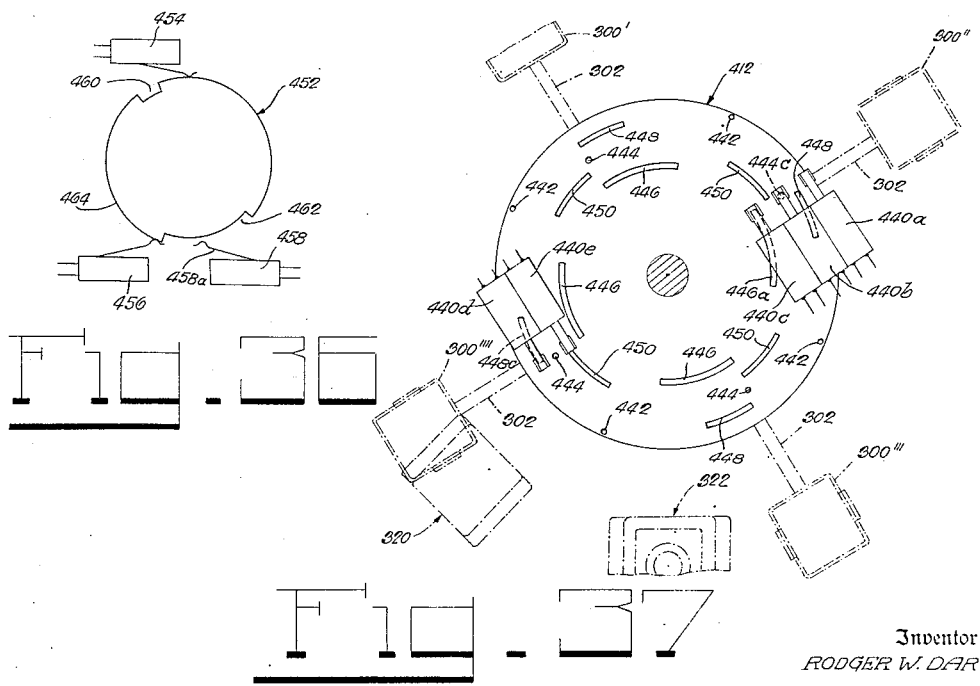

Patented May 9, 1950

2,506,632

UNITED STATES PATENT OFFICE 2,506,632

AUTOMATIC PHOTOGRAPHIC PLATE EXPOSING AND DEVELOPING APPARATUS

Rodger W. Dart, Essondale, British Columbia, Canada, assignor to International Mutoscope Corporation, Long Island City, N. Y., a corporation Application November 7, 1946, Serial No. 708,251

15 Claims. (Cl. 95—14)

This invention relates to photographic machines or apparatus, and more particularly to automatic apparatus of the type by which photographs may be taken and developed, and finished positives delivered within a short time.

Apparatus of this type is disclosed in a copending application of Sidney Jenkins and myself, Serial No. 659,520, filed March 1946, now Patent No. 2,473,280, issued June 14, 1949. This apparatus comprises a tray which moves in a rotary path, and in its travel picks up a photographic plate from a magazine and conveys it, first past a station at which the plate is exposed, and then progressively past stations at which different liquids for the development and re-development of the plate, are discharged into the tray. The tray, which is intermittently tilted for the discharge therefrom of the several waste liquids and also for the ejection therefrom of the finished photographic plate, is, during an operating cycle of the apparatus, moved continuously in its circular path, and the photographic plate in the tray is flash-exposed while passing through the exposure station.

It is the primary aim and object of the present invention to adapt the above apparatus to time exposure of a photographic plate, while using the tray for conveying the photographic plate to the several stations in the apparatus, including the exposure station, without having to interrupt the continuous movement of the tray for the exposure of the plate.

It is another object of the present invention to adapt the apparatus for a single-cycle operation or for an uninterrupted repeat-cycle operation.

The above and other objects, features and advantages of the present invention will be fully understood from the following description considered in connection with the accompanying illustrative drawings.

In the drawings:

Fig. 1 is a front elevation of photographic apparatus embodying the present invention;

Fig. 2 is a plan view, partly in section, of the apparatus;

Fig. 3 is a fragmentary plan view of the apparatus after the removal of certain parts therefrom for better illustration of certain structure which is normally hidden thereby;

Fig. 4 is a section taken substantially on the line 4—4 of Fig. 2, the section being developed as though lying in a plane for better diagrammatic illustration of various successive steps in the operation of the apparatus;

Fig. 5 illustrates that portion of a main cam which controls the various operating steps of the apparatus as depicted in Fig. 5;

Fig. 6 is an enlarged, fragmentary cross-section through the apparatus, taken substantially on the line 6—6 of Fig. 2;

Fig. 7 is a section taken on the line 7—7 of Fig. 6;

Fig. 8 is a section taken on the line 8—8 of Fig. 6;

Figure 21:
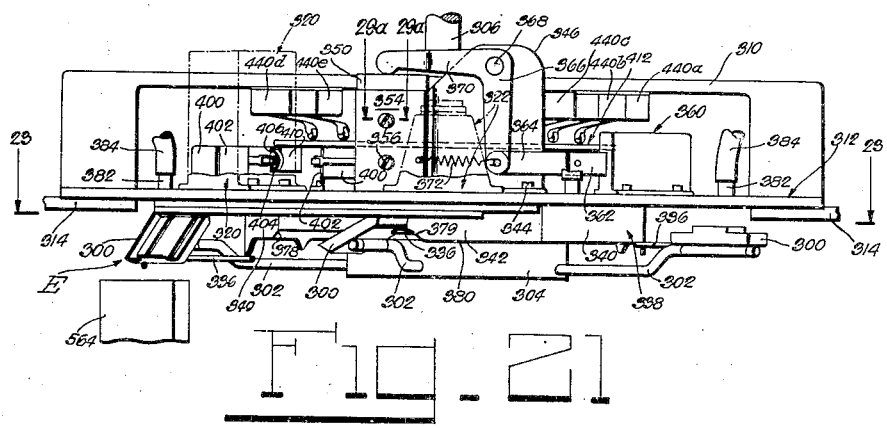
Figure 22:
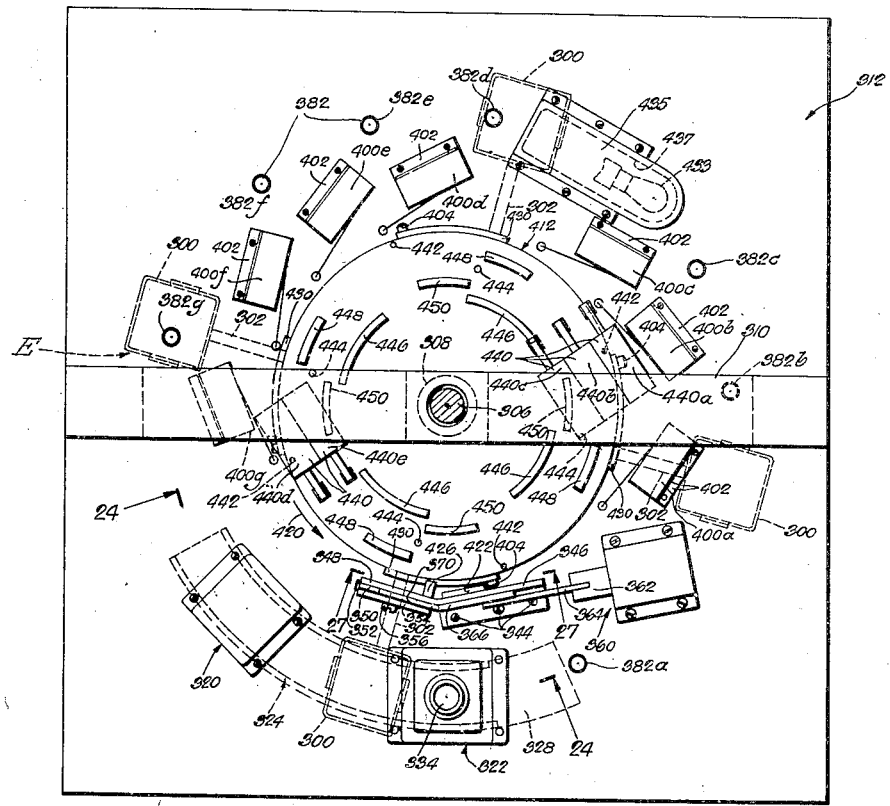

Fig. 9 sectionally illustrates a plate carrier and associated parts by which a photographic plate is ejected from the carrier;

Fig. 10 is a fragmentary plan view of a plate carrier;

Fig. 11 is an enlarged, fragmentary sectional view, partly in elevation, of the apparatus, the section being taken substantially on the line 11—11 of Fig. 2;

Fig. 12 is an elevational view of certain structure of the apparatus as viewed in the direction of the arrow 12 in Fig. 11;

Fig. 13 is a fragmentary side elevation of certain detail structure of the apparatus, as viewed in the direction of the arrow 13 in Fig. 11;

Fig. 14 is a section taken on the line 14—14 of Fig. 13;

Fig. 15 is an enlarged, fragmentary cross-section through part of the apparatus, the section being taken substantially on the line 15—15 of Fig. 2;

Figs. 16 to 20, inclusive, show a wiring diagram for the apparatus under different control conditions in an operating cycle of the apparatus;

Fig. 21 is a front elevational view of another apparatus embodying the present invention in a modified manner;

Fig. 22 is a plan view of the apparatus shown in Fig. 21;

Fig. 23 is a section taken substantially on the line 23—23 of Fig. 21;

Fig. 24 is a section taken substantially on the line 24—24 of Fig. 22, the section being developed as though lying in a plane for better diagrammatic illustration of various successive steps in the operation of the apparatus;

Fig. 25 and Fig. 26 illustrate the same portion in different positions of a main cam which controls the various operating steps of the apparatus as depicted in Fig. 24;

Fig. 27 is an enlarged fragmentary section taken substantially on the line 27—27 of Fig. 22;

Fig. 28 is a section similar to Fig. 27, showing a certain part in a different operative position;

Fig. 29 is a section taken on the line 29—29 of Fig. 27;

Fig. 29a is an enlarged section taken on the line 29a—29a of Fig. 21;

Fig. 30 is an elevational view, partly in section, of one of a number of certain instrumentalities used in the modified apparatus;

Fig. 31 is a wiring diagram illustrating the electrical control over the operation of the modified apparatus;

Fig. 32 shows a stepper element of the electrical control in one of its operative positions;

Fig. 33 shows a contact disc of the electrical control in one of its operative positions;

Fig. 34 shows the stepper element of the electrical control in another operative position;

Fig. 35 shows the contact disc of the electrical control in another operative position;

Fig. 36 shows the stepper element of the electrical control in a further operative position; and Fig. 37 shows the contact disc of the electrical control in a further operative position.

As usual in photographic apparatus of this general type, the present apparatus performs the following operations during one operating cycle thereof. A photographic plate, which is of a type suitable for the well-known development and re-development process, is transferred from a supply magazine to a camera where the exposure takes place, and the exposed plate is then conveyed past successive stations at which it is subjected to the action of the usual chemical solutions and water for its development and re-development. In the course of its development and re-development, the plate is washed with water after the application of each chemical solution, and is also exposed to light for its second exposure. The photographic plate is then ejected from the apparatus as a finished positive, and delivered as such to the subject whose picture was taken. To this end, the present apparatus comprises a number of mechanisms which are mounted on a preferably circular base plate 20 (Figs. 2 and 3). The base plate 20 is mounted in any suitable manner, as by mounting plates 23, in a cabinet 21 (shown in part in Figs. 1 and 2) which is customarily provided for photographic apparatus of this type. The various mechanisms are: a plate supplying and transferring mechanism A (Figs. 2 and 4); exposure mechanism B (Figs. 1, 2 and 4); plate developing and re-developing mechanism C (Figs. 2 and 6); cycle control mechanism D (Figs. 2 and 11); and electrical control mechanism E (Figs. 16 to 20).

*Plate supplying and transferring mechanism A*

As shown in Figs. 2 and 3, the base plate 20 is apertured at 22 to leave a relatively wide, arcuate web 24 and a relatively narrow, arcuate web 26 on said plate. The wider web 24 is provided with an arcuate slot 28 which constitutes the open width of an arcuate track 30 for a photographic plate 32. In order to support a photographic plate 32 in the track 30, the arcuate slot 28 has projecting within the confines thereof opposite gibs 34 which are suitably secured to the bottom side of the base plate 20 in any suitable manner as by welding, for instance. It appears from Fig. 3 that the gibs 34 terminate some distance away from one end of the arcuate slot 28 in the base plate 20, so as to leave a discharge gate 36 in the track through which a photographic plate 32 may descend after leaving the plate-supporting gibs 34 on movement in the track in counter-clockwise direction as viewed in Fig. 3. The plate track 30, including the plate discharge gate 36, is covered by a plate 38 (Figs. 2 and 4) which is suitably secured to the base plate 20, and not only serves as a cover for the track, but also as a mounting plate for certain devices of the apparatus. Thus, a plate-supply magazine 40 is removably mounted at 42 on the cover plate 38 (Figs. 2, 4 and 15). The magazine 40 may be of any suitable construction, and contains a supply of stacked photographic plates 32. An exhausted magazine may be removed and refilled, or a full magazine may be replaced therefor. The bottom of the magazine 40 is open and in communication, through an opening 44 in the cover plate 38, with the track 30 into which the stacked plates 32 may descend by gravity one by one. For all practical purposes, the opening 44 in the cover plate 38 may be considered a part of the magazine 40, so that only the lowermost plate 32' of the stack in the magazine 40 rests in the track 30 and may be transferred therein in the direction of the arrow 48 in Fig. 4, while the remaining plates of the stack are all within the confines of the magazine 40 and held therein against movement with the lowermost plate 32' as the same is being advanced in the track 30. Hence, only one plate 32 may descend at one time into the track 30 for transfer therein to the several operating stations of the apparatus.

The discharged plate 32' in the track 30 is advanced therein to and beyond an exposure station X (Figs. 2, 3 and 4) at which a camera 50 is mounted on the cover plate 38 as at 52. The camera 50 comprises the usual lens assembly 54 and a camera housing 56 which is at the bottom in open communication with an opening 58 in the cover plate 38 for the exposure of the advanced photographic plate 32'' at the exposure station X (Fig. 4).

For conveying the discharged photographic plate 32' past the several operating stations in the apparatus during an operating cycle of the latter, recourse is had to either one of a plurality of plate carriers 60 (Figs. 2 and 4), which are designed to perform the dual function of advancing the discharged photographic plate 32' in the track 30 to and beyond the exposure station X, and then carrying said plate past the remaining stations in the apparatus after the same leaves the track 30 through the discharge gate 36 thereof. In the present instance, there are provided two of these plate carriers 60 at the opposite ends, respectively, of a bar 62 (Figs. 6, 7 and 12) which is suitably mounted midway of its length on a central boss 64 of a turntable 66, journalled, in a manner to be described, for rotation about an axis $x$ centrally of the base plate 20. Hence, the plate carriers 60 travel in a circular path concentric with the plate track 30. Since the carriers 60 are identically mounted on the bar 62, the mounting of only one carrier will be described in detail. Each carrier 60 is tiltably mounted on the bar 62 (Figs. 6 and 7) through intermediation of a sleeve 68, the latter having a flattened portion 70 to which the carrier is suitably secured, as by welding, for instance. The carrier 60 is held against axial movement on the bar 62, and in operative alignment with the plate track 30, by means of a collar 72 on the adjacent outer end of the bar 62 and a torsion spring 74 on the inner end of the sleeve 68. The torsion spring 74 is anchored with one end in the bar 62 and with its other end in the sleeve 68, and is prewound so as to urge the carrier 60 in a counter-clockwise direction as viewed in Figs. 4, 7 and 12. Sleeve 68 may be provided with a peripheral slot 76 (Fig. 8) to cooperate with a stud screw 78 in the bar 62 in preventing counter-clockwise rotation of the carrier, by the action of the torsion spring 74, beyond the inclined disposition 60a shown in Fig. 4. For reasons which will become obvious hereinafter, however, the peripheral slot 76 in the sleeve 68 and the stud screw 78 in the bar 62 may be dispensed with.

The carrier bar 62 makes one complete revolution during a complete operating cycle of the apparatus. For the sake of brevity, the expression "operating cycle" as used hereinafter means "operating cycle of the apparatus." While the carrier bar 62 passes through one revolution in an operating cycle, the carriers 60 are controlled, in their angular disposition thereon, by a main cam 80 which is in form of a cylindrical member suitably secured to the base plate 20, as by a welded-on angle brace 82, for instance (Fig. 6). The bar 62 is, as earlier stated, carried by the turn table 66 which is journaled in any suitable manner in a suitably fixed disk 84 on a mounting bracket 86 on the base plate 20. More particularly the turn table 66 is mounted on an upright shaft 90 (Fig. 2) which is suitably journaled in the fixed disk 84.

Any suitable prime mover, such as an electric motor indicated M in the wiring diagram in Figs. 16 to 20, is adapted to drive the turn table 66 during an operating cycle. The motor M drives the turn table through intermediation of suitable reduction gearing, of which a driven gear 96 is carried by the shaft 90 on which the turn table is mounted (Fig. 2).

In the present instance, the photographic plates 32 may be of the well-known type in which the sensitized faces 100 thereof form the bottoms of trays 102 which are formed by the plates themselves (Figs. 3, 6, 7 and 9), the plates being provided with raised borders 104 which completely surround the sensitized faces 100 thereof. A photographic plate of this general type is shown and described in the patent to W. Rabkin et al., No. 2,192,755, dated March 5, 1940. Hence, the photographic plates 32 themselves provide trays for the reception of the various liquids for their development and redevelopment after their exposure.

Since the plate carriers 60 are identical in construction, only one will be described in detail. Each carrier 60 is in form of a relatively shallow receptacle 110 (Figs. 2, 6 and 10) having on its bottom raised longitudinal ribs 112 on which a photographic plate 32 may rest. The bottom of the receptacle 110 is also provided near the leading end thereof with spaced apertures 114 which serve for the discharge from the receptacle of the waste liquids flowing off a photographic plate 32 in said receptacle every time the latter is, in an operating cycle, tilted to the extent indicated by the dot-and-dash line position 60b of the carrier in Fig. 4. The carrier 60 is also provided with an outwardly extending follower 118 which is adapted to cooperate with the main cam 80, the associated torsion spring 74 (Fig. 6) urging the follower 118 into permanent engagement with the main cam 80. The tilting of the carrier into various positions, some of which are shown in Fig. 4, is under the control of the main cam 80, as will be readily understood.

The carrier 60 is furthermore provided at its rim 120 with raised, leading and trailing, plate-feeding lugs 122 and 124, respectively, which are used alternately for advancing a photographic plate 32 in the track 30 in a manner and for a purpose to be described presently.

The purpose of alternately using the feed lugs 122 and 124 for advancing a photographic plate in the track 30 is to accomplish an intermittent stop of the photographic plate at the exposure station in the track for a time exposure of the plate, despite continuous movement of the carrier during the time exposure. Thus, the carrier is in the level disposition 60c (Fig. 4) when approaching the track 30. As soon as the leading end of the carrier is below the track 30, the same is tilted into the dot-and-dash line position 60a (Fig. 4) in which the leading feed lug 122 thereof is in feeding relation with the discharged photographic plate 32' in the track. During continued movement of the carrier in the direction of the arrow 48 in Fig. 4, the leading feed lug 122 thereof will engage plate 32' and advance it in the track to the exposure station X, at which time the carrier is tilted to its level position, i. e., out of feeding engagement with the photographic plate. It is substantially at this point that an operating cycle terminates and a new operating cycle begins. In other words, an operating cycle ends by placing a photographic plate into position for exposure, the actual exposure of the plate being the first step in the next operating cycle. The carrier may, at the end of an operating cycle, come to rest in the full line position 60d in Fig. 4, for instance. On starting a new operating cycle, the carrier is tilted into the dot-and-dash line position 60e in Fig. 4, in which the trailing feed lug 124 thereon is in feeding relation with the plate 32" at the exposure station X, but some time will elapse before the lug 124 on the moving carrier will actually engage and feed the plate 32". It is this time lapse in an operating cycle which not only permits the time exposure of the plate 32" at the station X, but also affords the subject to be photographed a brief period during which he or she may get ready for the subsequent exposure. The trailing lug 124 of the moving carrier, when engaging the adjacent edge of the plate 32" at the exposure station X, will feed the plate in the track until the former leaves the gibs 34 and descends through the discharge gate 36 into the moving carrier, whereupon the latter is returned to the level disposition 60f in Fig. 4, ready for the reception by the plate therein of the first chemical solution in the development of the plate.

During an operating cycle, the carrier will pass through one complete revolution, starting from the position 60d in Fig. 4, and during this revolution perform the following functions. The same will, after the exposure of the plate 32" at the station X, feed the plate to the end of the track 30 and then carry the plate past the development and re-development stations to be described, to an ejector station Y (Fig. 2) where the finished photographic plate is discharged from the carrier into a chute 130 which guides the plate to the outside of the cabinet for delivery to the subject whose picture was taken. For the discharge of the plate from the carrier, the latter is tilted into the position 60g in Fig. 4. The carrier has by then passed through approximately three-fourths of its revolution, and will during the remainder thereof advance the last discharged photographic plate in the track to the exposure station X therein. The tilting of the carrier into the various positions 60a to 60g in Fig. 4 is under the control of the portions or lobes 80a to 80g, respectively, of the main cam 80 (Fig. 5).

For the discharge of a plate 32 from either carrier 60, there are provided a pair of ejector pins 131 at each end of a rod 133 (Figs. 6, 7 and 9) which extends parallel to the carrier bar 62 and is carried in any suitable manner by the boss 64 of the turn table 66. Each pair of ejector pins 131 will extend through the drain apertures 113 of its respective carrier 60 and eject a plate 32 therefrom (Fig. 9) on tilting the carrier into the position 60g shown in Figs. 4 and 9.

Exposure mechanism B

The exposure mechanism comprises the previously mentioned camera 50 at the exposure station X of the apparatus. Suitable shutter mechanism (not shown) is provided which is automatically operated in any suitable manner, preferably a few seconds after the start of an operating cycle so as to enable the subject to get ready for the exposure. As usual in apparatus of this type, the subject is seated in the cabinet in front of the camera, and a reflector unit (not shown) is provided on top of the camera in order to bring the subject into optical alignment with the camera lens. A reflector unit of this type which may be used in the present apparatus, is shown and described in the previously-mentioned co-pending application of Sidney Jenkins and myself.

Plate developing and re-developing mechanism C

Referring to Figs. 2 and 6, the fixed disk 84 is provided with a plurality of angularly spaced passages 140 which are in communication, through conduits 142, with suitable supplies of the chemical solutions and water, respectively, which are used in the development and re-development of an exposed photographic plate 32. The turn table 66 has a discharge passage 144 for each of the opposite plate carriers 60. More particularly, the passages 140 and 144 extend in part through steel rings 146 and 148, respectively, which are inserted in the disk 84 and the turn table 66, respectively, and the engaging surfaces 150 of which are ground so as to serve as "valve" surfaces with which to intercept communication between any of the passages 140 and either passage 144 when not in axial alignment with each other. The discharge passage 144 in the turn table 66, which is associated with the plate carrier 60d that starts the next operating cycle (Fig. 4), will, on travel of said carrier in said next cycle through the stations P to W in the apparatus (Fig. 2), align with the several passages 140 in the disk 84 which dispense the various chemical solutions and water for the development and re-development of a plate as follows. Having reference to Fig. 2, the passage 140a dispenses the first developer, passage 140b dispenses water, passage 140c dispenses bleaching solution, passage 140d dispenses water, passage 140e dispenses clearing solution, passage 140f dispenses water, passage 140g dispenses the second developer, and passage 140h dispenses water. Each time a chemical solution or water is discharged onto a plate 32 in the carrier, the latter is in the level disposition shown in Figs. 6 and 7, so that the plate therein will retain the discharged liquid in its own tray-like depression 102 for some time until the carrier is tilted, prior to the application of the next liquid, for the drainage of the waste liquid therefrom. It will be noticed from the described order in which the various liquids are applied, that each application of a chemical solution is followed by the application of water for removing all traces of the former and preparing the plate for the application of the next chemical solution. The main cam 80 is so designed, i. e., has the requisite number of properly coordinated cam lobes 80b (Fig. 4), that it tilts the carrier into the liquid drainage position 60b (Fig. 4) after each application to the plate in the carrier of a liquid, be it a chemical solution or water. The light in the room or hall in which the apparatus is located, is preferably utilized for the second exposure of the plate. To this end, the cabinet 21 is provided with a suitable window 161 (Figs. 1 and 2) through which light passes to the proper place in the apparatus where the second exposure of the plate takes place. The window 161 is preferably located above the base plate 20 in such a manner that light entering therethrough will re-expose an exposed plate 32 while the same is being carried past the stations S to W (Fig. 2), but will be kept from a plate in the track 30 or any plate between the latter and the bleaching station R (Fig. 2) by the wide web 24 of the base plate 20 so as to prevent fogging of a plate before and while it is subjected to the bleaching solution at the station R. Instead of resorting to outside light for the second exposure of a plate, recourse may be had to electric lighting means, such as a light bulb (not shown), within the cabinet 21, the light bulb being, of course, so placed therein that the wide web 24 of the base plate 20 acts as a satisfactory shield which protects a plate in the track 30 and any plate between the latter and the bleaching station R from light emanating from the light bulb.

Each discharge passage 144 in the turn table 66 is formed in part by a valve 162 which is operable to open and close said passage 144. Since the valves 162 are identical, only one will be described. Each valve 162 comprises a body 164 having a longitudinal passage 166 terminating in a lateral passage 168 which, in the open position of the valve, aligns with that part of the passage 144 which is provided in the turn table 66. In order to operate valve 162 into open and closed position, the same is journaled at 170 in the turn table 66 (Fig. 6), and is held against axial movement therein by a collar 172. Part of the valve body 164 is in form of a nozzle 174 which extends with its discharge end above, and within the confines of, the adjacent carrier 60, and into such proximity to a plate 32 therein as to discharge liquid onto the latter without, however, obstructing the previous gravity descent of said plate (Fig. 2) from the track 30 through the discharge passage 36 thereof and into the carrier. The valve body 164 is also provided with a laterally extending arm 176 having a projecting finger 178, adapted to cooperate with structure to be described for turning the valve into closed position. The valve body 164 is further provided with a lateral lug 177 which is adapted to cooperate with structure to be described for turning the valve into open position.

Cycle control mechanism D

As previously stated, a photographic plate 32 is, at the beginning of an operating cycle, in the position 32" (Fig. 4) at the exposure station X, and the particular carrier which is to carry this plate through the remaining stations in the apparatus, is at the beginning of the cycle in the full-line position 60d in Fig. 4. This leaves the opposite carrier in the home position 60h in Fig.

2. Since both carriers 60 pass, during an operating cycle, through one revolution from their respective home positions, and since, in a selected single cycle performance of the apparatus, only the carrier 60d (Fig. 4) may perform its designated functions during the cycle, the other carrier and its associated valve 162 are rendered inoperative. To this end, there is provided a tilter cam 180 (Figs. 11 and 12) which is vertically slidable on a bracket 182 on top of the fixed disk 84. In the present instance, the shank 184 of the cam 180 is provided with a longitudinal slot 188 for the reception of screws 186 which are threaded into the bracket 182. The tilter cam 180 is normally urged by a spring 190 into the inoperative, dot-and-dash line position shown in Figs. 11 and 12, and is depressed against the action of the spring 190 by an arm 192, pivotally mounted at 194 on the bracket 182. The arm 192 has a lateral extension 196 which is operatively connected through a link 202 with the core 198 of a solenoid 200, suitably mounted at 204 on the bracket 182. On energization of the solenoid 200, the core 198 thereof is retracted into the full-line position shown in Fig. 11, whereby the arm 192 depresses the tilter cam 180 from the dot-and-dash line position into the operative, full-line position shown in Figs. 11 and 12.

The depression of the tilter cam 180 takes place at a period in the operating cycle when the carrier and associated valve to be rendered inoperative reach in their travel the position shown in Fig. 12, i. e., shortly before the carrier reaches the magazine 40. At this position, the carrier is already tilted into the manual plate-feeding disposition shown in dot-and-dash lines in Fig. 12, and the associated valve 162 is in open position as also shown in dot-and-dash lines in Fig. 12. However, before the carrier reaches and actually feeds the last discharged plate 32' in the track 30, the tilter cam 180 descends and engages the finger 178 on the valve 162 and turns the latter from its open position into the closed, full-line position shown in Fig. 12. When the valve 162 is thus turned into closed position, an extension 210 on the arm 176 of the valve engages an inwardly projecting finger 212 on the associated carrier 60 and turns the latter into the level, full-line disposition shown in Fig. 12. The valve 162 encounters sufficient frictional resistance in its journal bearing 170 in the turn table 66 to counteract any tendencies of the yieldingly urged carrier to move it toward open position, and will remain in its closed position and hold the carrier in the depressed, level position for clearance of the magazine and track as it passes the same on its continued travel. The valve 162 and associated carrier 60 remain in their closed and level positions, respectively, until they pass, in the next cycle, a valve-return cam 214 in front of, and in close proximity to, the tilter cam 180 (Figs. 2, 11, 13 and 14). This cam 214 is mounted at 215 on the fixed disk 84, and is provided with a notch 217 and a depending lug 219. When either valve 162 is in its open position, it will clear the cam 214 when passing the same (Fig. 13). However, when either of the valves 162 is in its closed position (see dot-and-dash line position in Fig. 14) it will, when passing the cam 214, be turned thereby into the open, full-line position shown in Fig. 14. Thus, while the cam 214 will, in any operating cycle, open any closed valve 162 and permit the return of the associated carrier 60 to the control of the main cam 80, the tilter cam 180 will, during any selected single-cycle operation of the apparatus, render the then idle carrier and its associated valve 162 inoperative.

However, if a repeat cycle of operation of the apparatus is selected, in a manner described hereinafter, the normal descent of the tilter cam 180 is prevented during the first of the two successive operating cycles, resulting in the normal functioning of both carriers, even though one carrier follows the other, and the cycle of one carrier overlaps the cycle of the other. In this connection, provisions (hereinafter described) are made to prevent the stoppage of the apparatus at the end of the first operating cycle, and to continue the operation of the apparatus to the end of the succeeding cycle. The single or repeat cycle operation of the apparatus is under the control of the user of the same, and depends on the deposition of a coin or coins in the apparatus prior or subsequent to the termination of an operating cycle.

*Electrical control mechanism E*

Referring to Figs. 16 to 20, there is shown a wiring diagram of the present apparatus in the different conditions during an operating cycle of the latter. Current for operating the motor M, which turns the turn table 66, is derived from any suitable power line 220 of 110 volt A. C., for instance. A "starting" circuit for the motor M comprises a lead 222, a normally closed, conventional snap switch 224, and a lead 226. The snap switch 224 is of the type which is normally closed except when its operating arm 228 is depressed as shown in Fig. 19. Switch 224 is under the control of a "stepper" 230 with which are associated a solenoid winding 232 and an escapement member 234 for controlling the movement of the stepper into several operating positions. The stepper 230 has a rearward extension 236 which acts as a movable core in the solenoid winding 232, and has also two operating fingers 238 and 240 which are provided with cam projections 242 and 244, respectively. The operating finger 238 of the stepper 230 is also provided with a plurality, in the present instance three, tooth-like depressions 246 with which the escapement member 234 cooperates in a manner to be described. The stepper 230 is normally urged by a spring 248 in a direction opposite to the direction of pull of the energized solenoid winding 232. The escapement member 234 is pivoted and cooperates with any one of the teeth 246 in the stepper normally to prevent movement of the latter under the pull of the spring 248. Movement of the stepper 230 under the pull of the spring 248 is permitted by the escapement member 234 for a distance of one tooth 246 in response to each actuation or rocking motion of the escapement member by means of a solenoid 250, the core 252 of which is operatively connected with said escapement member. The circuit for the stepper solenoid winding 232 comprises a lead 254, a normally open "coin" switch 256 and leads 258. In the home position of the apparatus, the stepper 230 assumes the position shown in Fig. 19, in which switch 224 is opened by the cam projection 244 on said stepper, and the described starting circuit for the motor M is consequently open. On deposition of a coin C (Fig. 16) in the apparatus, the same temporarily bears against and closes the coin switch 256, closing thereby the circuit of the stepper solenoid winding 232. This results in retraction of the stepper 230 from the most advanced position shown in Fig. 19 into the most retracted position shown in Fig. 16, in which the snap switch 224 is no longer held open by the cam projection 244 and is, instead, in its normally closed position, closing thereby the starting circuit for the motor M and causing the latter to operate. Since the described starting circuit of the motor M is interrupted prior to the termination of the operating cycle, a holding circuit for the motor M is provided which, after the start of an operating cycle, is closed and remains closed until the end of the cycle. This holding circuit comprises the lead 222, a lead 260, a normally closed switch 262, a lead 264, and lead 226. The switch 262 is under the control of a cam disk 266 which has two diametrically opposite cam lobes 268 and assumes, in the home position of the apparatus, the disposition shown in Fig. 16 in which one of the cam lobes 268 holds switch 262 open. The disk 266 is turned in any suitable manner in synchronism with the turn table 66 so that, soon after the start of an operating cycle, the switch 262 is permitted to close, resulting in closing of the described holding circuit for the motor M. It may be stated here that the starting circuit for the motor M is still closed when the other cam lobe 268 momentarily opens switch 262 in the holding circuit at the half-way mark in an operating cycle, but this starting circuit will be opened prior to the return of the cam disk 266 into home position after one complete revolution thereof, when the same cam lobe 268 again opens the switch 262 and holds the same open until after the start of the next operating cycle. Hence, while the start of the motor operation is under the control of the coin switch 256, the termination of the motor operation in an operating cycle is under the control of the cam disk 266 which controls the holding circuit for the motor.

The circuit for the tilter cam solenoid 200 (Fig. 11) may be traced in the wiring diagram, and comprises a lead 270, a conventional snap switch 272, a lead 274, a normally open switch 276 and a lead 278 in which the winding of the solenoid 200 is interposed. Switch 272 is normally open unless its operating arm 280 is depressed in the manner shown in Fig. 17. Switch 276 may be closed by either one of two diametrically opposite cam lobes 282 on a disk 284 which turns also in any suitable manner in synchronism with the turn table 66. The switches 272 and 276 are series-connected in the described solenoid circuit, and the latter is, soon after the start of an operating cycle, conditioned for closure by closing switch 272. Switch 272 is closed by the cam projection 242 on the stepper 230 after a shift of the latter into the intermediate position shown in Fig. 17 by the pull of the spring 248 and under the control of the escapement member 234. The escapement solenoid 250 is in a circuit which comprises leads 290 and 292 in one of which a normally open switch 294 is interposed. Switch 294 is under the control of a disk 296 which is also turned in any suitable manner in synchronism with the turn table 66 and has two diametrically opposite cam lobes 298, either one of which will close switch 294 when in operative engagement therewith. One of these cam lobes 298 will, soon after the start of an operating cycle, close switch 294, thereby causing energization of the escapement solenoid 250 and consequent operation of the escapement member 234 and a spring-shift of the stepper 230 from the most retracted position shown in Fig. 16 into the intermediate position shown in Fig. 17, in which switch 272 in the circuit of the solenoid 200 is closed by the cam projection 242 on the stepper. Closure of switch 272 soon after the start of an operating cycle will, however, not result in closure of the circuit of the solenoid 200, since the other switch 276 therein is, at this stage in the operating cycle, still open. The circuit of the solenoid 200 will be closed only when the idle carrier 60 in the present operating cycle reaches the dot-and-dash line position adjacent the magazine 40, as shown in Fig. 12, at which time the cam lobe 282 on the disk 284 closes switch 276, thereby finally closing the circuit of the solenoid 200, as indicated in Fig. 18. Closure of this solenoid circuit results in the depression of the tilter cam 180 in the previously described manner, as well as in closure of the passing valve 162 and depression of the associated idle carrier 60 into level position for and beyond the remainder of the present operating cycle. Soon after the tilter cam 180 has been depressed, the circuit of the escapement solenoid 250 is again closed by virtue of the closure of the switch 294 by the next cam lobe 298 of the disk 296, as shown in Fig. 19. The stepper 230, is, in consequence of the closure of the escapement solenoid circuit, permitted to spring-advance to its most advanced position in which switch 272 is no longer under the control of the cam projection 242 on the stepper, and is open, resulting in opening of the circuit of the tilter cam solenoid 200. In the most advanced position of the stepper 230 (Fig. 19), switch 224 in the starting circuit of the motor M is opened by the cam projection 244 on the stepper, with the result that this starting circuit is opened. However, the motor M will continue to operate until the end of the cycle, since the previously described holding circuit for the motor remains closed until the end of the operating cycle.

The present apparatus may be conditioned during an operating cycle thereof for a repeat cycle. To this end, the user of the apparatus may, at any time between the conditioning of the tilter cam solenoid circuit (Fig. 17) and the actual closing of this circuit (Fig. 18), insert another coin C in the machine (Fig. 20) and thereby effect retraction of the stepper 230 from the intermediate position shown in Fig. 17 into the most retracted position shown in Fig. 20, resulting in opening of the switch 272. Hence, when at the normal closure period of the tilter cam solenoid circuit in an operating cycle, switch 276 is closed (Fig. 18), the series-connected switch 272 is open, with the result that the tilter cam solenoid circuit remains open and the tilter cam 180 does not perform its usual function. In that case, the hitherto idle carrier 60 in the present operating cycle will, in its travel, pick up a photographic plate at the magazine and convey it through a normal operating cycle, starting from the exposure station X. By the same token, the associated valve 162 will remain open and permit the discharge of the various chemical solutions and water onto the photographic plate to be developed and re-developed during the repeat cycle of the apparatus.

While the hereinbefore described apparatus comprises two plate carriers 60, I also contemplate the use of a greater number of these carriers in an apparatus of this type in order to obtain a greater number of photographs in a given time. Thus, the apparatus shown in Figs. 21 and 22 may, for instance, be provided with four plate carriers 300 which are tiltably mounted on the ends of equi-angularly spaced bars 302, carried by a hub 304 on a vertical shaft 306 (see also Fig. 23). Shaft 306 may be journalled in a bearing bracket 308 (Fig. 22) which is suitably suspended from a mounting bracket 310 on top of the base plate 312 of the apparatus. The instant apparatus shown in Figs. 21 and 22, which is in many respects like the previously described apparatus of Figs. 1 and 2, except as hereinafter pointed out, may be mounted by plates 314 in a cabinet (not shown) which may to all intents and purposes be like the cabinet 21 previously described and shown in part in Figs. 1 and 2, except that the window 161 may be dispensed with since the present apparatus relies for the second exposure of a photographic plate on artificial light within the cabinet rather than on outside light.

The present apparatus is provided with a photographic plate-supply magazine 320 and a suitable camera 322, both of which are suitably mounted on the base plate 312. The apparatus is also provided with an arcuate track 324 (Figs. 22 and 24), which may be like the track 30 in the previously described apparatus and serves to guide photographic plates 326, as they are discharged from the magazine, to and beyond the camera 322. The end of the track 324 adjacent the camera 322 is provided with a discharge gate 328 through which a plate 326 descends onto a carrier 300 when fed by the latter off the track 324. The base plate 312 is apertured at 330 (Fig. 24) to permit the gravity descent of the stacked plates 326 from the magazine 320 into the track 324, and is further apertured at 332 beneath the camera 322 (Fig. 24) to expose a plate 326 beneath the camera to the lens assembly 334 thereof (Fig. 22).

The carriers 300 may to all intents and purposes be like those of the previously described apparatus, except that their followers 336 extend inwardly of the apparatus and cooperate with a control cam 338 which is cylindrical as shown in Figs. 21 and 23, and arranged concentrically of the shaft 306. The control cam 338 comprises two complementary sections 340 and 342 (Fig. 23) of which the former is suitably mounted on the base plate 312 at the bottom thereof, while the other section 342 is guided for vertical movement in a manner to be described presently. Mounted at 344 on top of the base plate 312 is a bracket 346 (Figs. 21 and 22), having a lateral extension 348 on which a shank 350 of the movable cam section 342 is slidable. More particularly, the shank 350 of the cam section 342 extends through a slot 352 in the base plate 312 and is held against the lateral bracket extension 348 by a cover plate 354 which is secured to, and held properly spaced from, the bracket extension 348 by screws 356 (see also Fig. 29a) which extend through a longitudinal slot 358 in the shank 350 of the cam section 342 and guide the latter for vertical movement. The cam section 342 is urged into the uppermost or normal position shown in Figs. 21 and 25 by means of a suitable spring or springs (not shown), and is moved into the lower or "depressed" position shown in Fig. 26 by means of a solenoid 360 (Fig. 21) which acts on the shank 350 of cam section 342 through intermediation of solenoid core 362, a link 364 and a bell crank lever 366, the latter being pivotally mounted at 368 on the bracket 346 and having its arm 370 in operative alignment with the shank 350. A spring 372 may be provided to urge the solenoid core 362 and the parts connected therewith into inoperative position in which the cam section 342 is admitted to its normal position (Figs. 1 and 25).

The ultimate purpose of the movable cam section 342 is to control the angular disposition of any carrier 300 in the vicinity of the magazine 320 and camera 322 so as to render the apparatus adaptable for a single operating cycle or for a number of different repeat cycles. The specific function of the movable cam section 342 is to cause any plate carrier 300 to feed or bypass a photographic plate 326 which has been discharged from the magazine 320 into the track 324, and to resume the feed of, or bypass, a plate 326 in the track underneath the camera 322. Thus, when the cam section 342 is in its normal position (Fig. 25) any plate carrier 300, approaching the magazine 320 in its normal travel in the direction of the arrow 376 in Fig. 24, is permitted, by the cam descent 378 in the fixed cam section 340 and by the cam section 342, to rock into the plate-feeding position 300a (Fig. 24) and remain in this position for the feed of a plate 326 in the track from the magazine 320 to the camera 322. The same carrier 300 is, during its continued movement in the direction of the arrow 376 and while the cam section 342 remains in its normal position, depressed by the cam rise 379 into the level disposition 300b, thereby leaving a plate 326 in the track 324 underneath the camera 322.

The cam section 342 may be forced into its depressed position (Fig. 26) immediately after any plate carrier 300 is admitted to the plate-feeding position 300a (Fig. 24) and shortly before the same actually engages the adjacent discharged plate 326 in the track 324, in order to return the carrier into the level disposition 300c and cause the same to bypass said plate. Also, when the cam section 342 is in its depressed position (Fig. 26), its cam rise 379 and dwell 380 will force any passing carrier 300 into the plate-feeding disposition 300d (Fig. 24). The same carrier will, when clearing the cam section 342 in its continued travel, be returned to the level disposition 300e (Fig. 24) and to the control of the fixed cam section 340.

Threaded in, or otherwise secured to, the base plate 312 are a plurality of angularly spaced pipes or conduits 382 which communicate through hose connections 384 with suitable supplies (not shown) of the chemical solutions and water, respectively, which are commonly used in the development and re-development of a plate 326. The various conduits 382 are so circularly arranged on the base plate 312 that they may discharge directly onto plates on the carriers 300 as they pass these conduits. Interposed in each hose connection 384 is a control valve 386 (Fig. 30), the body 388 of which has transverse, intersecting passages 390 and 392, the former serving as a fluid passage and the latter receiving the movable core 394 of a solenoid 396. The core 394 acts as a valve which is suitably spring-urged into the full line position in Fig. 30 normally to intercept communication through the passage 390, and which provides communication therethrough when retracted into the dot-and-dash line position on energization of the solenoid 396. The discharge conduits 382a, 382b, 382c, 382d, 382e, 382f and 382g (Fig. 22) dispense first developer, water, bleaching solution, water, clearing solution, second developer and water, respectively, and these liquids are applied to a plate to be treated in the order in which they were mentioned.

As stated, the discharge of the several liquids through their respective conduits 382a to 382g is under the control of the associated solenoid-operated valves 386. The solenoid 396 of each of these valves is in a separate circuit which includes a snap switch 400. The switches 400 for the several solenoids 396 are mounted on individual brackets 402 on top of the base plate 312 in the manner shown in Figs. 21 and 22. More particularly, the switches 400a to 400g are associated with the discharge conduits 382a to 382g, respectively, in the relation shown in Fig. 22. Associated and movable with each carrier 300 is a switch actuator 404 which, on passing either one of the switches 400a to 400g, closes the same, resulting in the discharge of a liquid from the associated conduit 382 onto a plate in the carrier which in its travel passes then below said conduit.

Each switch actuator 404 is, in the present instance, in the form of a screw head (Figs. 21, 22, 27 and 28) in one end of a lever 406 which is pivotally carried at 408 on a block 410, depending from a control disk 412 which is mounted on the vertical shaft 306 above the base plate 312 for rotation with the carriers 300. Each lever 406 is held in frictional engagement with its block 410 by means of a compression spring 414 (Fig. 29) which surrounds the mounting pivot 408 and is interposed between the block 410 and a head screw 416 at the inner end of the pivot 408. Each lever 406 is, therefore, frictionally retained in any angular position into which it may be turned. When the lever 406 assumes the fullline or "operative" position shown in Fig. 27, its screw head 404 is in operative alignment with the switches 400a to 400g and will close the same successively when traveling with its associated carrier 300 in the normal direction indicated by the arrow 420 in Fig. 22. However, when the lever 406 is turned into the dot-and-dash line or "inoperative" position shown in Fig. 27, its screw head 404 is out of operative alignment with the switches 400 and will not close the same when passing them.

Provided on the bracket 346 is a cam lug 422 (Figs. 22, 27 and 28), the inclined surface 424 of which engages the screw head 404 of any passing lever 406 and rocks the latter from operative position into the inoperative position shown in dot-and-dash lines in Fig. 27, in which the screw head 404 is out of operative alignment with the switches 400a to 400g. Each lever 406 will remain in its inoperative position unless cammed into operative position by a cam lug 426. The control over the dispensation of the several liquids for the development and re-development of the photographic plates 326 should obviously be such that these liquids are discharged onto a carrier only when the same holds a photographic plate, and will not be discharged onto any empty carrier. Appropriately, the control over the dispensation of the liquids is exercised by the movable cam section 342 which has to be depressed for the pickup by any carrier of an exposed photographic plate 326 underneath the camera 322 (Fig. 24), as was previously explained. To this end, the cam lug 426 (Figs. 22, 27 and 28) is carried by the shank 350 of the movable cam section 342 and extends rearwardly through a slot in the bracket extension 348 into operative alignment with the levers 406. In being carried by the cam section 342, the cam lug 426 will be lowered into the operative position shown in Fig. 28 when said cam section is depressed and, hence, conditioned for the pickup by any passing carrier 300 of a photographic plate 326 underneath the camera 322. The cam lug 426 is in its operative position (Fig. 28) in the path of movement of the tail end 430 of any lever 406 in its inoperative, dot-and-dash line, position shown in Fig. 28, and will cam the latter into its operative position as shown in dotted lines in Fig. 28. Any lever 406 which is thus returned to its operative position, will remain in that position until again returned to inoperative position by the fixed cam lug 422 when passing the latter.

The shaft 306, which carries the plate carriers 300 and the control disk 412, is driven in any suitable manner, at reduced speed, from a prime mover, such as an electric motor M indicated in the wiring diagram in Fig. 31. The camera 322 is provided with the customary, normally closed shutter (not shown), which is opened by suitable linkage, actuated by a solenoid 432 indicated in the wiring diagram in Fig. 31. The present apparatus is also provided with a second exposure light in the form of an electric light blub 433 (Fig. 22), which is located in a suitable housing 435 on top of the base plate 312 and casts its light through an aperture 437 in the latter downwardly onto any passing carrier 300. The aperture 437 is so arranged that the light from the bulb 433 will be confined to the area below the base plate 312 within which the second exposure of a plate on any carrier is to take place, and will not penetrate to other areas where non-exposed, or exposed but non-developed, plates may become fogged thereby.

Suspended from the overhead bracket 310 in any suitable manner are conventional snap switches 440 which are arranged in two series. One series of these switches comprises a "shutter switch" 440a, a "stepper index" switch 440b and a "motor" switch 440c, while the other series comprises a "magazine feed" switch 440d and a "camera feed" switch 440e. These switches, which are normally open, are adapted to be closed by suitable actuators on the control disk 412. Thus, switch 440a is adapted to be closed by any one of four actuators in the form of screw heads 442. Switch 440b is adapted to be closed by any one of four actuators 444 which are also in the form of screw heads. Switch 440c is adapted to be closed by any one of the four actuators 446, switch 440d is adapted to be closed by any one of four actuators 448, and switch 440e is adapted to be closed by any one of four actuators 450, each of the actuators 446, 448 and 450 being in form of an arcuate bar or projection on the control disk 412.

The electrical control for the present apparatus includes a rotary stepper 452 (Fig. 31) which is adapted to control another "magazine feed" switch 454, another "motor" switch 456 and another "camera feed" switch 458, the switches 454, 456 and 458 being also conventional snap switches. The stepper 452 is provided with opposite peripheral notches 460 and 462. Switch 454 is permitted to assume its normally open position when the end of its blade 454a projects into the notch 460 of the stepper 452 (Fig. 32), and is closed when blade 454a rides on the periphery 464 of the stepper. Switch 456 is permitted to assume its normally closed position when its blade 456a projects into the notch 462 of the stepper, and is opened when said blade assumes the full-line position shown in Fig. 31, i. e., rides on the periphery 464 of the stepper. Switch 458 is permitted to assume its normally open position when its blade 458a projects into the notch 462 in the stepper 452, and is closed when said blade assumes the dot-and-dash line position shown in Fig. 31, i. e., rides on the periphery 464 of the stepper. The stepper 452 is normally urged by a spring (not shown) into the position shown in dot-and-dash lines in Fig. 31, and is indexed as hereinafter described through successive positions into the home position shown in full lines in Fig. 31, in which the apparatus is at rest. The indexing mechanism 466 for the stepper 452 (Fig. 31), comprises a ratchet disk 468 which is suitably drivingly connected with the latter, and an indexing pawl 470 which cooperates with the ratchet disk 468 and is pivotally carried at 472 on a lever 474 which is independently turnable coaxially of the ratchet disk 468. A spring 476 normally urges pawl 470 into engagement with the ratchet disk 468. Also cooperating with the ratchet disk 468 is a holding pawl which is pivotally mounted at 480 and normally urged into engagement with the ratchet disk by a spring 482. The holding pawl 478 is preferably provided with a tail 484 which, when said holding pawl is moved out of engagement with the ratchet disk at the beginning of an operating cycle of the apparatus, engages the tail 486 of the indexing pawl 470 and rocks the same also out of engagement with the ratchet disk, thus releasing the latter and the stepper 452 for spring-return into the first operative position in an operating cycle as shown in dot-and-dash lines in Fig. 31. The pawl-carrying lever 474 is normally urged by a spring 488 in clockwise direction as viewed in Fig. 31, and is turned in the opposite ratchet-indexing direction by means of a solenoid 490, the core 492 of which is connected with the lever 474, and the winding 494 of which is in series connection with the stepper index switch 440b through a lead 496 (Fig. 31). The holding pawl 478 is retracted from engagement with the ratchet disk 468 by a solenoid 498, the core 500 of which is connected with the pawl, and the winding 502 of which is connected by leads 504 and 506 with any suitable power line 508 of 110 volt, A. C. current, for instance. Interposed in the lead 506 is a normally open "coin" switch 510 which is closed on deposition of a coin C in the apparatus so as to close the circuit through the solenoid winding 502.

As in the apparatus previously described and shown in Figs. 1 and 2, the present apparatus is in home or rest position when one of the carriers 300 comes to rest in the full-line position shown in Fig. 24. The several carriers 300 then assume the disposition shown in Figs. 23 and 31. It may be stated in advance that a non-exposed photographic plate 326 is underneath the camera 322 at the beginning of each operating cycle of the apparatus.

An operating cycle of the apparatus is started by depositing therein a coin C which momentarily closes the switch 510 (Fig. 31) before passing on to a coin box (not shown), whereby the circuit through the solenoid 498 is closed, resulting in retraction of the pawls 478 and 470 from the ratchet disk 468 and thereby permitting the stepper 452 to unwind from the full-line or home position into the first operative, dot-and-dash line position shown in Fig. 31. In the latter position of the stepper 452, the switches 454, 456, and 458 are closed. The motor switch 456 then closes a main circuit through the motor M, comprising a lead 520, switch 456, a lead 522, and a lead 524. Closure of this circuit results in operation of the motor M and consequent rotation of the carriers 300 and the control disk 412 from the starting position shown in Figs. 22 and 31. Closure of the camera feed switch 458 conditions for later closure a shutter circuit, which comprises a lead 526, the shutter solenoid 432, a lead 528, switch 440a, leads 530 and 532, switch 458 and a lead 534 (Fig. 31). Closure of the magazine feed switch 454 conditions for later closure a circuit through the cam depresser solenoid 360, which comprises a lead 536, solenoid 360, a lead 538, switch 440d, a lead 540, switch 454 and a lead 542. The described shutter circuit will be closed when the actuator 442a on the control disk 412 (Fig. 31) passes the switch 440a and closes the latter momentarily. Some time will elapse after the start of an operating cycle until the actuator 442a closes switch 440a, permitting the person to be photographed to get ready for the exposure, which will take place when the described shutter circuit is closed. Immediately at the start of the cycle, the "active" carrier 300' adjacent the camera 322 is tilted out of feeding relation with the plate 326 underneath the camera into level disposition by the rise 379 on the movable cam section 342 in its normal position (Fig. 25). This same carrier 300' is, in the present operating cycle, adapted to pick up the plate 326 underneath the camera immediately after the same is exposed. At that time in the cycle, the actuator 459a on the control disk 412 (Fig. 31) has moved into closing relation with switch 440e, closing thereby the previously described circuit through the cam depresser solenoid 360 which includes the series-connected camera feed switches 458 and 440e. Closure of this circuit results in depression of the movable cam section 342 and corresponding tilting of the carrier 300' into plate-feeding relation with the exposed plate underneath the camera as shown at 300d in Fig. 24. The actuator 459a on the control disk 412 is of sufficient length to cause the cam section 342 to be held depressed until the carrier 300' has fed the exposed plate 326 off the track 324, whereupon the former drops onto the carrier for conveyance past the various liquid discharge conduits 382. While the cam section 342 is thus depressed, its cam lug 426 cams the valve switch-actuating lever 406 of the carrier 300' into operative position so that the various liquids will be discharged onto the exposed plate in said carrier as the latter passes the several discharge conduits 382.

Shortly after the exposed plate 326 has dropped off the track 324 and onto the carrier 300', and when the latter is permitted to return to its level disposition 300e (Fig. 24) by the return of the cam section 342 to its normal position (Fig. 25), the actuator 444a on the control disk 412 moves into closing relation with the stepper index switch 440b (Fig. 33), closing thereby a circuit through the stepper index solenoid 490, which comprises a lead 554, the winding 494 of solenoid 490, lead 496, switch 440b and a lead 556 (Fig. 31). Closure of this latter circuit results in the advance by the indexing mechanism 466 of the stepper 452 counterclockwise as viewed in Fig. 32 into the first indexing position there shown, in which the switches 454 and 458 are permitted to open by the notches 460 and 462, respectively, in the stepper, while the motor switch 456 remains closed. At this point in the operating cycle the next carrier 300'' reaches a position near the magazine 320 as indicated in Fig. 33. Since in the first indexing position of the stepper 452 (Fig. 32) the magazine feed switch 454 is open, the previously described circuit through the cam depresser solenoid 360, in which the switches 454 and 440d are series-connected, will remain closed despite closure at this time of the magazine feed switch 440d by the actuator 442a on the control disk 412 (Fig. 33). Hence, the cam depresser solenoid 360 will not be energized and the cam section 342 will remain in its normal position (Fig. 25), resulting in tilting of the carrier 300″ into the plate-feeding position 300a (Fig. 24) and in the feed by said carrier of a plate 326 from the magazine 320 to the camera 322. When the fed plate 326 reaches the camera the rise 379 on the cam section 342 in its normal position (Fig. 25) will return the carrier 300″ into level disposition, i. e., out of feeding relation with the plate. The carrier 300″ continues its travel while in level disposition, thereby failing to pick up the non-exposed plate 326 which it just fed to the camera 322. Also, since the cam section 342 has not been depressed during the passage of the carrier 300″, the valve switch-actuating lever 406 associated with the latter carrier has not been returned to operative position by the cam lug 426 (Fig. 27), as will be readily understood from the preceding description. Hence, carrier 300″, which in the present operating cycle is an "idle" carrier, will not be subjected to any liquids from the discharge conduits 382 as will be readily understood.

As the next carrier 300‴ approaches in the present operating cycle the magazine 320 (Fig. 35), the actuator 448b on the control disk 412 moves into closing relation with the stepper index switch 440b, closing thereby the previously-described circuit through the stepper index solenoid 490 (Fig. 31) and causing the stepper 452 to be advanced to the second indexing position shown in Fig. 34, in which the magazine feed switch 454 is closed, while the other switches 456 and 458 remain in the same position as in the previous indexing position of the stepper. Immediately after the stepper 452 has been indexed into the second indexing position (Fig. 34), the actuator 448b on the control disk 412 moves into closing relation with the magazine feed switch 440d, closing thereby the previously-described circuit through the cam depresser solenoid 360 in which the switches 454 and 440d are series-connected. Closure of this circuit results in depression of the cam section 342 (Fig. 26) and in tilting of the carrier 300‴ into the position 300c (Fig. 24) so that the latter bypasses the plates 326 at the magazine 320. The cam projection 448b (Fig. 35) is of such length as to clear switch 440d and, hence, open the last-mentioned circuit through the cam-depresser solenoid 360, when the carrier 300‴ in its travel clears the magazine 320 completely. Hence, the carrier 300‴, when approaching the rise 379 on the cam section 342, is in the full-line position shown in Fig. 24, and will be depressed by the cam rise 379 into level disposition to clear the non-exposed plate 326 underneath the camera 322. As in the case of the preceding carrier 300″, the valve switch-actuating lever 406 associated with the carrier 300‴ will, on passing the fixed cam lug 422 (Fig. 27) be rocked into inoperative position, and will not be returned to operative position by the cam lug 426 since the cam section 342 is in its normal position when the switch actuator 404 on the lever 406 of the carrier 300‴ passes the lug 426 (Fig. 27). Hence, no liquids will be discharged onto the "idle" carrier 300‴, as will be readily understood.

When in the continued travel of the carriers 300 in the present operating cycle the carrier 300‴ approaches the magazine 320 (Fig. 37), the actuator 444c moves into closing relation with the stepper index switch 440b, closing thereby the described circuit through the stepper index solenoid 490, resulting in further advance of the stepper 452 into the third indexing or home position shown in Fig. 36, in which the magazine and camera feed switches 454 and 458, respectively, remain in the same position as in the preceding indexing position of the stepper, but the motor switch 456 is then opened by the periphery 464 of the stepper. Hence, the described main circuit through the motor M is now open and the motor M would stop, were it not for the fact that the cam projection 446a on the control disk 412 is then in closing relation with the motor switch 440c, thereby closing a holding circuit through the motor M, which comprises a lead 560, switch 440c, a lead 562 and the lead 524 (Fig. 31). The cam projection 446a (Fig. 37) is of such length as to maintain this holding circuit closed until the "active" carrier 300′ arrives, after 270° rotation from its start in the present operating cycle, at a plate-ejecting station E (Figs. 22 and 23), at which the carrier is tilted by the cam 338 to eject the finished plate into a discharge chute 564 through which it is guided to the outside of the cabinet within reach of the customer whose picture was taken. While the carriers 300 travel through the last stage in the present operating cycle, with the stepper 452 in the third indexing or home position shown in Fig. 36, the carrier 300″″ passes the magazine 320. The actuator 446c on the control disk 412 moves then into closing relation with the magazine feed switch 440d, closing thereby the previously described circuit through the cam depresser solenoid 360 in which the switches 454 and 440d are series-connected, and causing depression of the cam section 342. Depression of the cam section 342 at this time causes the carrier 300″″ to bypass the plates 326 at the magazine 320. The carrier 300″″ continues its travel until it arrives in the position of the carrier 300′ in Fig. 31, at which time the latter carrier arrives at the plate-ejecting station E and the described holding circuit for the motor M is opened and the apparatus comes to a stop.

The above-described cycle of operation of the apparatus is a single cycle uninterrupted by a repeat cycle. However, the present apparatus is also adapted for repeat cycle operation. By a repeat cycle is meant the performance by any carrier 300 of its designated plate-feeding and conveying function during operation of the apparatus and while any other carrier performs the identical function. Each cycle, whether initial or repeat, starts with the active carrier adjacent the camera, as described, and must be initiated by the deposit of money in the apparatus. Any one of these several carriers 300 may perform on a repeat cycle, depending on the time of deposit of additional money in the apparatus during any operating cycle of the latter. In the absence of any special coin mechanism, and with the simple coin switch arrangement shown, by way of example, in Fig. 31, money for initiating any repeat cycle of the apparatus must be deposited during the preceding operating cycle, and it is the plate carrier which next approaches the camera after the deposition of said money that performs its designated plate-feeding-and-conveying function during this repeat cycle.

However, since the deposition of money in the apparatus for the initiation of any operating cycle results in the release of the stepper 452 for spring-return from home position to the first operative position shown in dot-and-dash lines in Fig. 31, deposition of money in the apparatus, while the stepper is in the first operative position, in no way changes the electrical control of the apparatus for a single operating cycle thereof and accordingly no repeat cycle will then take place. For this reason, no money for a repeat cycle should be deposited in the apparatus while the stepper is in the first operative position. Also, to avoid possible non-operation of any carrier, no money should be deposited in the apparatus for a repeat cycle while the carrier which immediately follows the presently active carrier in an initial operating cycle only, passes the magazine 320. A patron is not likely to deposit money in the apparatus during any one of above-mentioned conditions in an operating cycle, because these conditions are in point of time so close to the plate-exposure period in said cycle that the patron does not have sufficient time to deposit money after the exposure while such conditions exist. However, a notice is preferably posted on the cabinet in which the apparatus is housed, advising the patron to delay the deposit of money for a repeat cycle for a specified length of time after each exposure. Instead of, or in addition to, such notice, any suitable mechanism (not shown) may be provided for the return to the patron of money deposited in the apparatus during the existence of any one of the abovementioned conditions in a present operating cycle, when no repeat cycle will be initiated despite the deposition of money therefor in the apparatus.

Having thus described my invention, what I claim and desire to secure by Letters Patent is:

1. In photographic apparatus having an exposure station and a track for a photographic plate leading past said station and having a plate-discharge end, a carrier for a photographic plate movable beneath and in the direction of said track toward the discharge end thereof, lugs on said carrier at its leading and trailing ends, respectively, said lugs being alternately movable transversely of said direction to and from said track to bring either lug into an operative position in which to push a plate along said track and off the latter at the discharge end thereof, means for moving said carrier uninterruptedly in said direction along said track toward and beyond the discharge end thereof, and means moving the leading and trailing lugs from and to their respective operative positions, respectively, when a plate pushed along said track by said leading lug reaches said station, and said carrier being in receiving relation with a plate being pushed off the discharge end of said track by said trailing lug.

2. In photographic apparatus having an exposure station, a track for a photographic plate leading past said station and having a plate-discharge end, and a photographic plate-supply magazine located between said station and the other end of said track and normally discharging its foremost plate into said track, a carrier for a photographic plate movable beneath and in the direction of said track toward the discharge end thereof, lugs on said carrier at its leading and trailing ends, respectively, said lugs being alternately movable transversely of said direction to and from said track to bring either lug into an operative position in which to push a plate along said track and off the latter at the discharge end thereof, means for moving said carrier uninterruptedly in said direction toward and beyond the discharge end of said track, and means moving the leading and trailing lugs from and to their respective operative positions, respectively, when a plate discharged from said magazine and pushed along said track by said leading lug reaches said station, and said carrier being in receiving relation with a plate being pushed off the discharge end of said track by said trailing lug.

3. In photographic apparatus having an exposure station and a track for a photographic plate leading past said station and having a plate-discharge end, a tray for a photographic plate movable beneath and in the direction of said track toward and beyond the discharge end thereof and having an upwardly projecting lug at its trailing end, said tray being also tiltable about a substantially horizontal axis transverse to said direction to bring said lug to and from a position in which to push a plate along said track and off the latter at the discharge end thereof into said tray.

4. In photographic apparatus having an exposure station and a track for a photographic plate leading past said station and having a plate-discharge end, a tray for a photographic plate movable beneath and in the direction of said track toward the discharge end thereof and having upwardly projecting lugs at the leading and trailing portions, respectively, of its rim, said tray being also tiltable about a substantially horizontal axis transverse to said direction to bring either lug into an operative position in which to push a plate along said track and off the latter at the discharge end thereof, means for moving said tray uninterruptedly in said direction toward and beyond the discharge end of said track, and means tilting said tray to bring the leading and trailing lugs from and to their respective operative positions, respectively, when a plate pushed along said track by said leading lug reaches said station, said tray being in receiving relation with a plate being pushed off the discharge end of said track by said trailing lug.

5. In photographic apparatus having an exposure station, a track for a photographic plate leading past said station and having a plate-discharge end, and a photographic plate-supply magazine located between said station and the other end of said track and normally discharging its foremost plate into the latter, a tray for a photographic plate movable beneath and in the direction of said track toward the discharge end thereof and having upwardly projecting lugs at the leading and trailing portions, respectively, of its rim, said tray being also tiltable about a substantially horizontal axis transverse to said direction to bring either lug into an operative position in which to push a plate along said track and off the latter at the discharge end thereof, means for moving said tray uninterruptedly in said direction toward and beyond the discharge end of said track, means tilting said tray to bring the leading and trailing lugs from and to their respective operative positions, respectively, when a plate discharged from said magazine and pushed along said track by said leading lug reaches said station, and said tray being in receiving relation with a plate being pushed off said track by said trailing lug.

6. In photographic apparatus having spaced exposure and development stations, the combination of a track for a photographic plate, said track leading to and beyond said exposure station and having a plate-discharge end between said stations, a plate-carrier movable underneath and along said track toward and beyond the discharge end thereof to said development station, and means on said carrier movable into said track to push a plate along said track and off the latter and onto said carrier at the discharge end of said track.

7. In photographic apparatus having spaced photographic plate-supply, exposure, and development stations, the combination of a track leading from said plate-supply station to and beyond said exposure station and having a plate-discharge end between the latter station and said development station, a plate carrier movable underneath and along said track toward and beyond the discharge end thereof to said development station, and means on said carrier movable into said track to push a plate along said track and off the latter and onto said carrier at the discharge end of said track.

8. In photographic apparatus having a first exposure station, a track for a photographic plate leading past said station and having a plate-discharge end, a second plate-discharge station near the other end of said track, and a plate-supply magazine normally discharging the foremost plate therein into said track at a third station therein between said other track end and said first station, plate carriers movable in unison in one direction in a circuitous path and spaced from each other longitudinally of said path so that they pass successively from said second station to and along said track beneath the same and back to said second station, each carrier having upwardly projecting lugs at its leading and trailing ends, respectively, and being tiltable about a substantially horizontal axis between said lugs extending transversely of said path so that said lugs are beneath said track when said carrier is in substantially horizontal disposition and said lugs are in operative positions, respectively, in said track to push a plate therein from said third station past said first station and off the discharge end of the track when said carrier is tilted in opposite directions, respectively, and passes said track, means along said track tilting each passing carrier so that its leading lug is in operative position while passing said third station and until a plate pushed thereby in said track reaches said first station, then oppositely tilting said carrier so that its trailing lug is in operative position and pushes the same plate along the track and off the discharge end thereof onto the carrier, and means operable to hold any carrier in substantially horizontal disposition while passing said third station.

9. The combination in photographic apparatus as set forth in claim 8, in which said tilting means is a first cam along said track against which each passing carrier is normally yieldingly urged, and said holding means is an auxiliary cam movable into position to cooperate with a passing carrier and disengage it from said first cam.

10. The combination in photographic apparatus as set forth in claim 8, in which said tilting means and holding means comprise a cam along said track having separate longitudinal sections of which one section is movable into two different positions in which to tilt a passing carrier so that its leading lug is in operative position and to hold the same carrier in substantially horizontal disposition, respectively, while said carrier passes said third station.

11. In photographic apparatus wherein a photographic plate is intermittently moved from one station to another, the combination with a substantially horizontal track for a photographic plate, of a member vertically spaced from said track and having two lugs projecting toward said track and being spaced in the direction of the latter, means for uninterruptedly moving said member in said direction, and means for rocking said member about an axis extending intermediate said lugs transversely of said track to bring either lug into a position relative to said track in which position it may contact and push a plate along said track.

12. In photographic apparatus having an exposure station and a substantially horizontal track for a photographic plate leading to and beyond said station, the combination of a member vertically spaced from said track and having two lugs projecting toward said track and being spaced in the direction of the latter, said member being rockable about an axis extending intermediate said lugs transversely of said track to bring either of said lugs into an operative position relative to said track in which position it may contact and push a plate along said track, means for moving said member uninterruptedly in said direction, and means rocking said member to bring the leading lug from, and the trailing lug to, its respective operative position relative to said track when a plate pushed along said track by said leading lug reaches said station.

13. In photographic apparatus having an exposure station, a substantially horizontal track for a photographic plate leading to and beyond said station, and a photographic plate-supply magazine spaced from said station and normally discharging its foremost plate into said track, the combination of a member vertically spaced from said track and having two lugs projecting toward said track and being spaced in the direction of the latter, said member being rockable about an axis extending intermediate said lugs transversely of said track to bring either of said lugs into an operative position relative to said track in which position it may contact and push a plate along said track, means for moving said member uninterruptedly in said direction successively past said magazine and station, and means rocking said member to bring the leading lug from, and the trailing lug to, its respective operative position relative to said track when a plate discharged from said magazine and pushed along said track by said leading lug reaches said station.

14. In photographic apparatus wherein a photographic plate is intermittently moved from one station to another, the combination with a track for a photographic plate having a plate-discharge end, of a carrier for a photographic plate, said carrier being below said track and movable uninterruptedly in the direction of said track toward and beyond the discharge end thereof, and a lug on said carrier projecting from the trailing end of the latter toward said track, said carrier being also rockable about an axis extending remotely from said trailing end transversely of said direction to bring said lug to and from an operative position relative to said track in which position it may contact and push a plate along said track and off the latter onto said carrier at the discharge end of said track.

15. In photographic apparatus wherein a photographic plate is intermittently moved from one station to another, the combination with a track for a photographic plate having a plate-discharge end, of a carrier for a photographic plate, said carrier being below said track and uninterruptedly movable in the direction of the latter toward and beyond the discharge end thereof, and two lugs on said carrier projecting at the leading and trailing ends, respectively, of the latter toward said track, said carrier being also rockable about an axis extending intermediate said lugs transversely of said direction to bring either lug into an operative position relative to said track in which position it may contact and push a plate along said track and off the latter at the discharge end thereof, and said carrier being in receiving relation with a plate being pushed off the discharge end of said track by the trailing lug.

RODGER W. DART.

REFERENCES CITED

The following references are of record in the file of this patent:

UNITED STATES PATENTS

| Number | Name | Date |
|---|---|---|
| 432,903 | Sacco | July 22, 1890 |
| 754,090 | Powers | Mar. 8, 1904 |
| 1,862,190 | McCowan | June 7, 1932 |
| 2,218,656 | Pifer | Oct. 22, 1940 |